(12) United States Patent
Yamashita et al.

(10) Patent No.: US 12,163,971 B2
(45) Date of Patent: Dec. 10, 2024

(54) AUTOMATIC ANALYSIS APPARATUS

(71) Applicant: HITACHI HIGH-TECHNOLOGIES CORPORATION, Tokyo (JP)

(72) Inventors: Taichiro Yamashita, Tokyo (JP); Takenori Okusa, Tokyo (JP); Susumu Sakairi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 374 days.

(21) Appl. No.: 16/644,622

(22) PCT Filed: Aug. 22, 2018

(86) PCT No.: PCT/JP2018/031050
§ 371 (c)(1),
(2) Date: Mar. 5, 2020

(87) PCT Pub. No.: WO2019/092949
PCT Pub. Date: May 16, 2019

(65) Prior Publication Data
US 2021/0063422 A1 Mar. 4, 2021

(30) Foreign Application Priority Data
Nov. 8, 2017 (JP) .................................. 2017-215202

(51) Int. Cl.
*G01N 35/04* (2006.01)
*G01N 35/00* (2006.01)

(52) U.S. Cl.
CPC ... *G01N 35/04* (2013.01); *G01N 2035/00306* (2013.01); *G01N 2035/0465* (2013.01);
(Continued)

(58) Field of Classification Search
CPC ......... G01N 35/04; G01N 2035/00306; G01N 2035/0465; G01N 2035/0484;
(Continued)

(56) References Cited

U.S. PATENT DOCUMENTS 2,526,503 A * 10/1950 Raque .................... B66B 13/08
49/138
7,360,984 B1* 4/2008 Sugiyama .............. G01N 35/04
422/65
(Continued)

FOREIGN PATENT DOCUMENTS

JP 09-127127 A 5/1997
JP 2002-233424 A 8/2002
(Continued)

OTHER PUBLICATIONS

International Search Report of PCT/JP2018/031050 dated Nov. 27, 2018.
(Continued)

*Primary Examiner* — P. Kathryn Wright
*Assistant Examiner* — Curtis A Thompson
(74) *Attorney, Agent, or Firm* — MATTINGLY & MALUR, PC

(57) ABSTRACT

A driving mechanism for moving a vessel having a disposal box placed thereon in a front-rear direction the same as an opening/closing direction of a drawer is provided lower than a bottom surface of the vessel. A first rail extended in a movement direction of an operating unit, a second rail extended in a movement direction of the vessel provided in the drawer, and toothed pulleys for rotating a toothed belt within a horizontal plane are arranged. The first rail, the second rail, and the toothed belt are placed side by side without overlapping with each other in a vertical direction. As a result, the operation of taking out the disposal box in which used sample dispensing tips or reaction vessels are accumulated is simple.

3 Claims, 20 Drawing Sheets

(52) U.S. Cl.
CPC ............... *G01N 2035/0484* (2013.01); *G01N 2035/0498* (2013.01)

(58) Field of Classification Search
CPC . G01N 2035/0498; G01N 2035/00277; B65G 2203/0283
See application file for complete search history.

(56) References Cited

U.S. PATENT DOCUMENTS

| | | | | |
|---|---|---|---|---|
| 2005/0145704 | A1* | 7/2005 | Hwang | F25D 25/025 62/448 |
| 2018/0265288 | A1* | 9/2018 | Huber | B65F 1/1421 |
| 2018/0328953 | A1* | 11/2018 | Andrade | G01N 35/04 |

FOREIGN PATENT DOCUMENTS

| | | |
|---|---|---|
| JP | 2007-046956 A | 2/2007 |
| JP | 2015-68701 A | 4/2015 |
| WO | WO-2011122562 A1 * 10/2011 | ............. G01N 35/04 |

OTHER PUBLICATIONS

International Preliminary Report on Patentability received in corresponding International Application No. PCT/JP2018/031050 dated May 22, 2020.
Chinese Office Action received in corresponding Chinese Application No. 201880058587.8 dated May 20, 2023.
Chinese Office Action received in corresponding Chinese Application No. 201880058587.8 dated Feb. 16, 2023.

* cited by examiner

[FIG. 1]
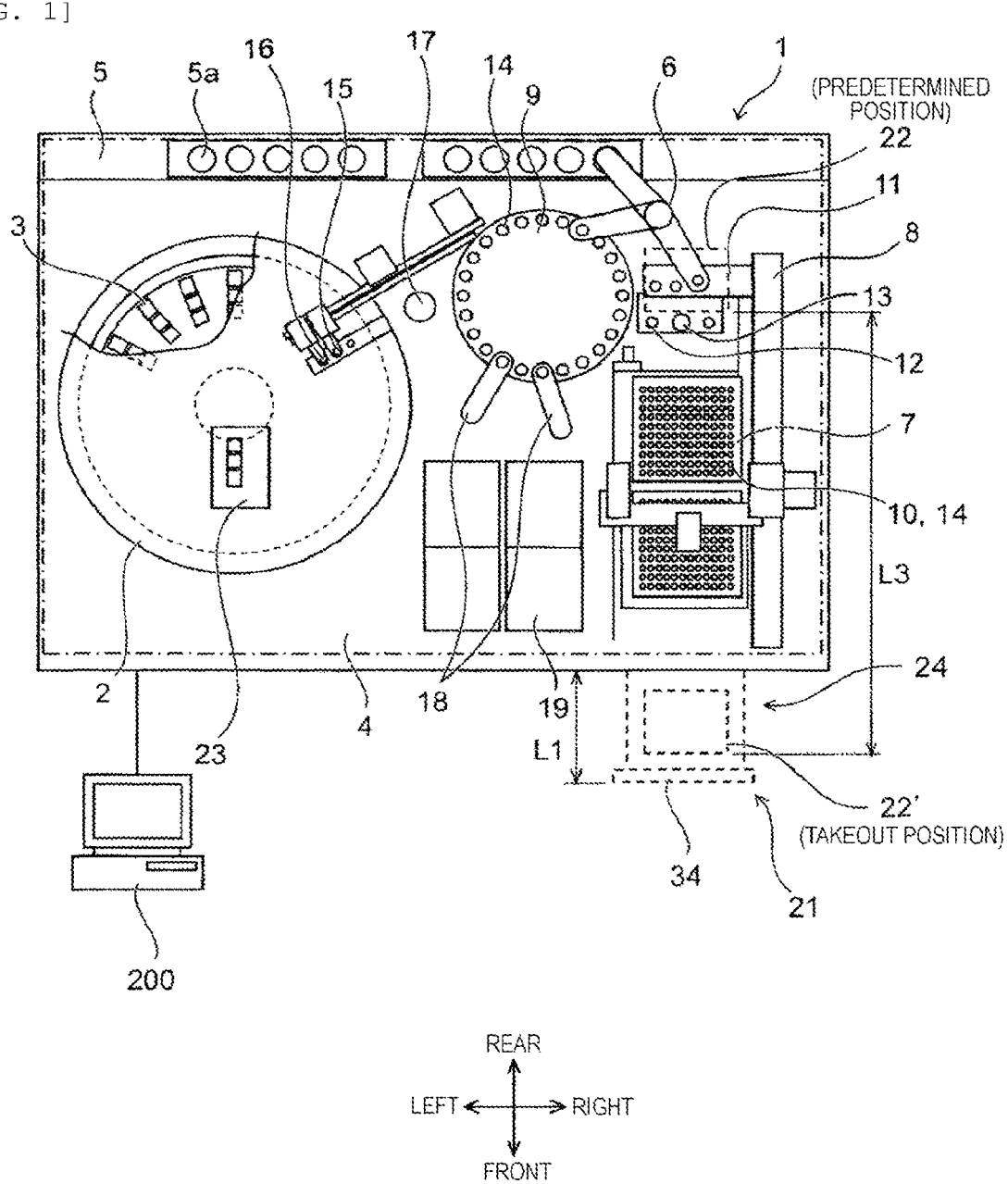

[FIG. 2]
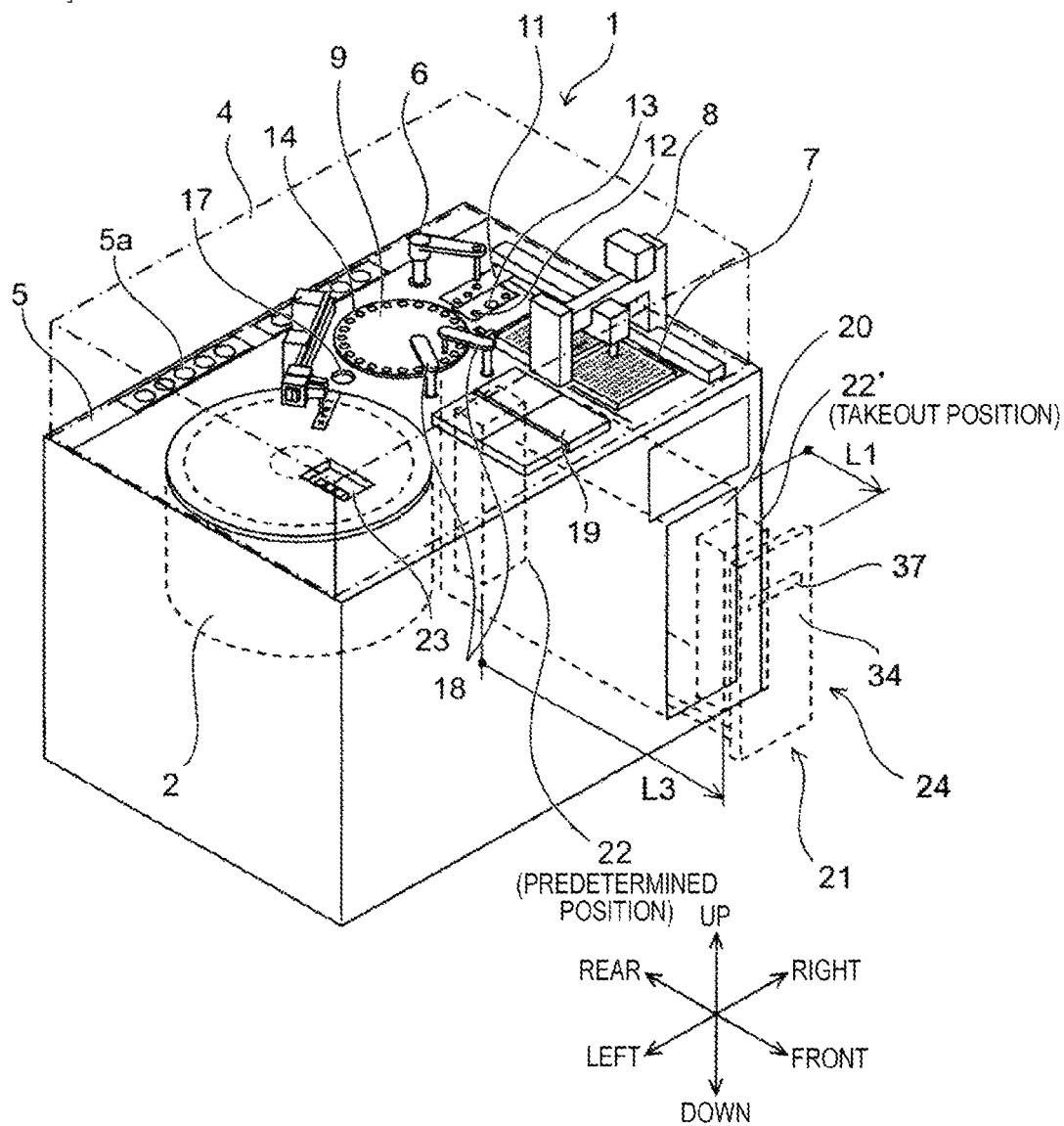

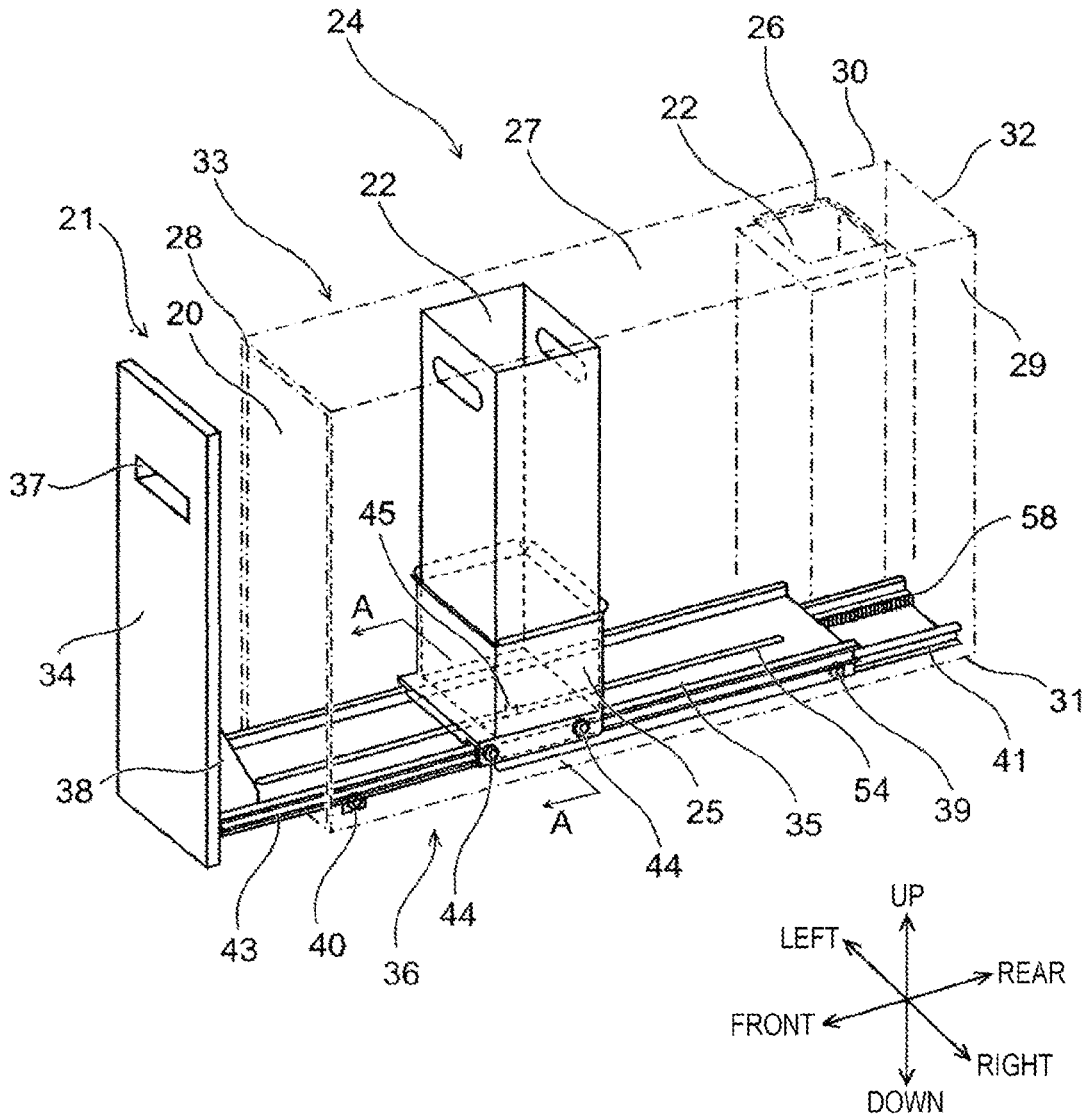
[FIG. 3]

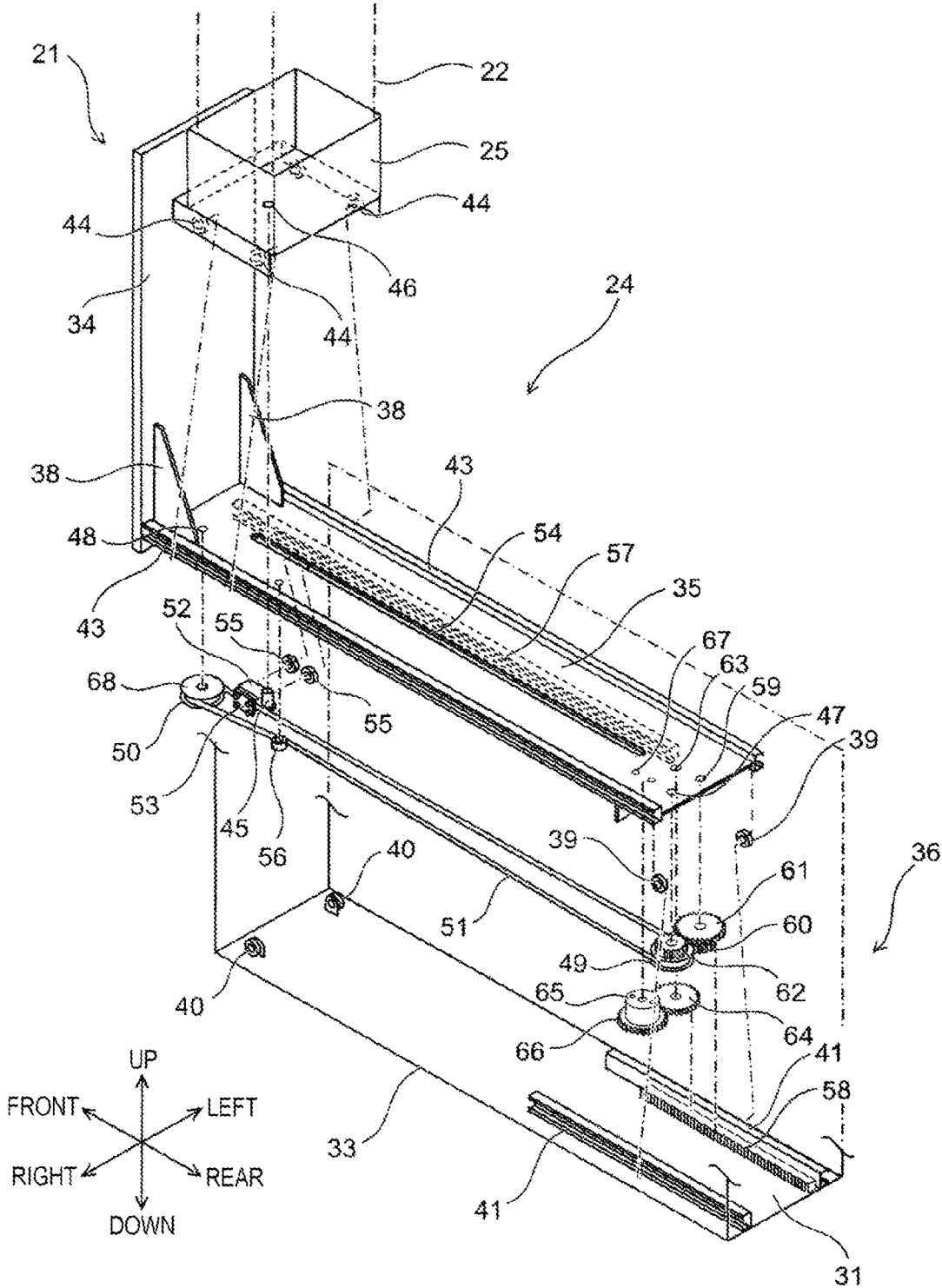
[FIG. 4]

[FIG. 5]
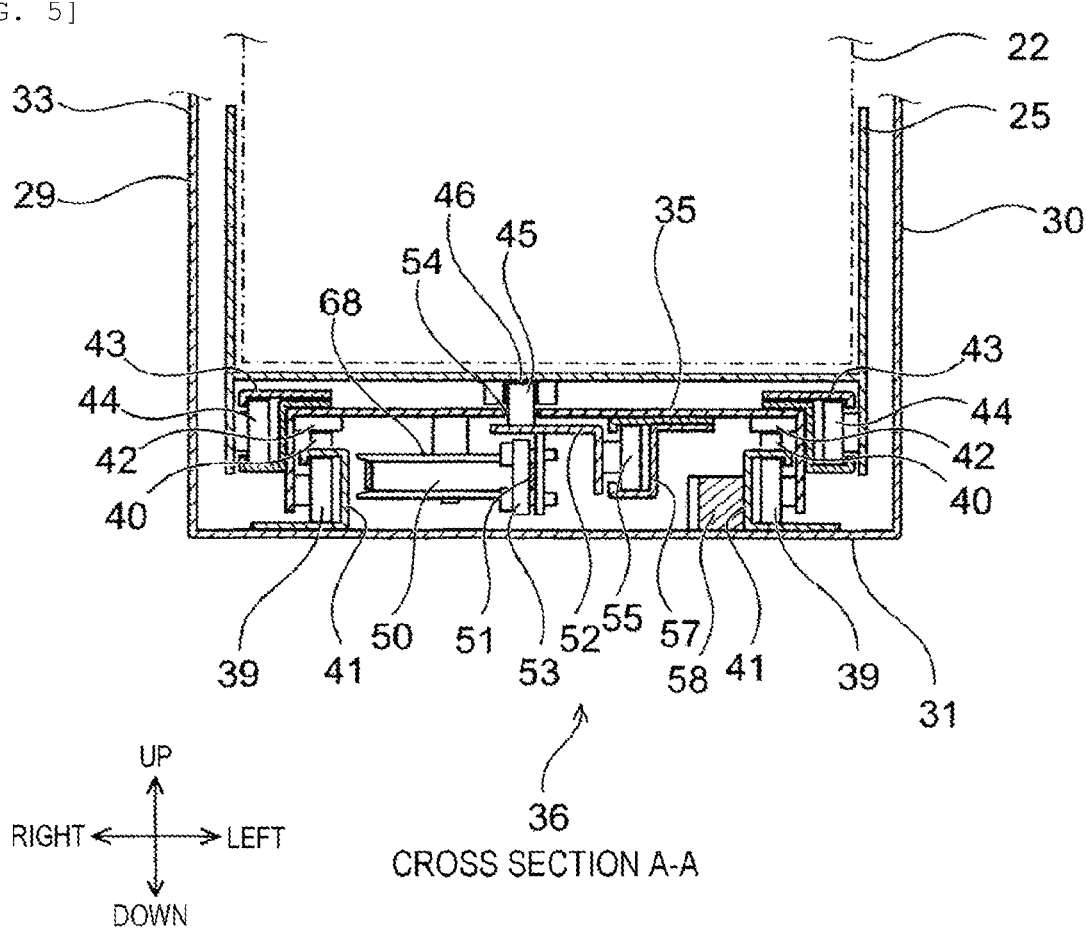
CROSS SECTION A-A
[FIG. 6A]
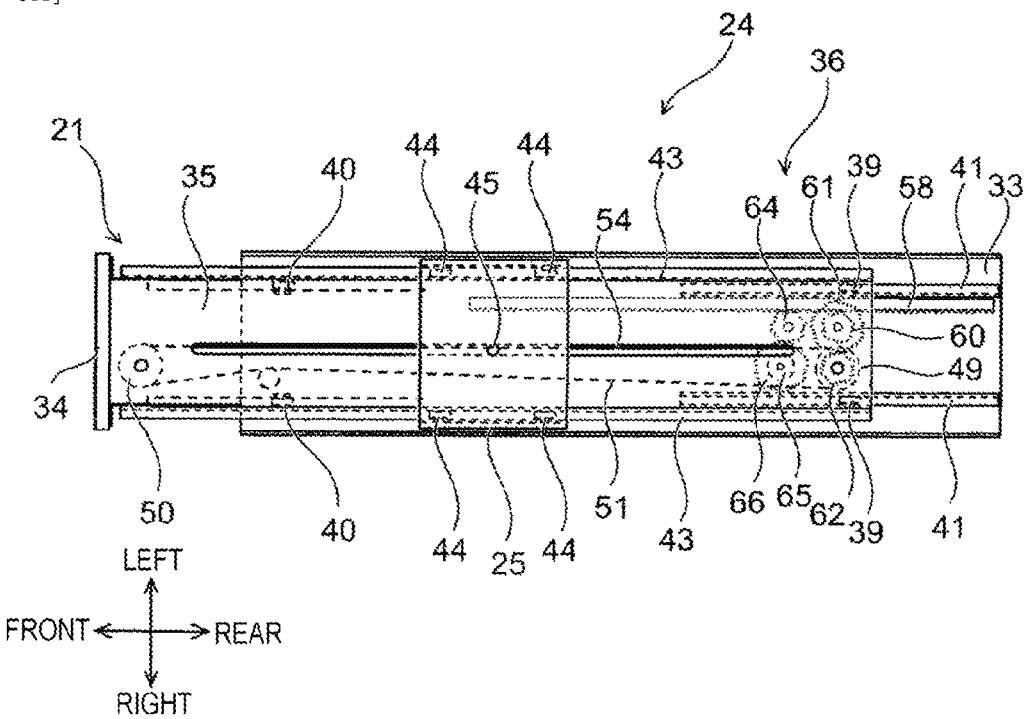

[FIG. 6B]
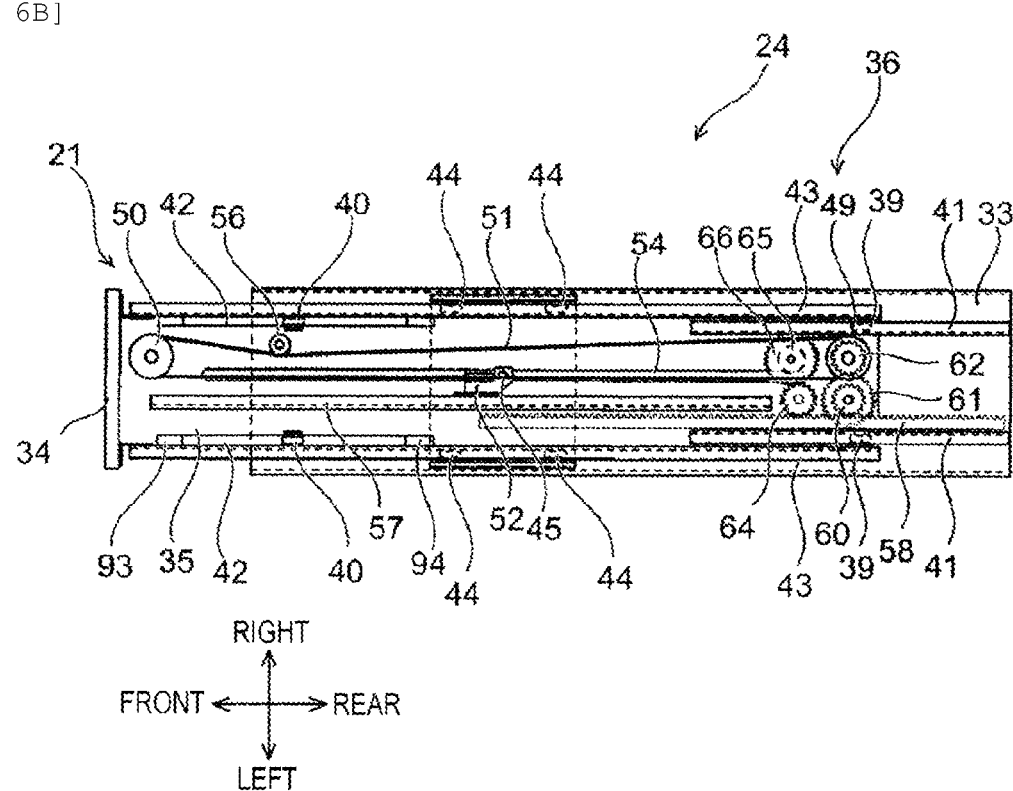

[FIG. 7]
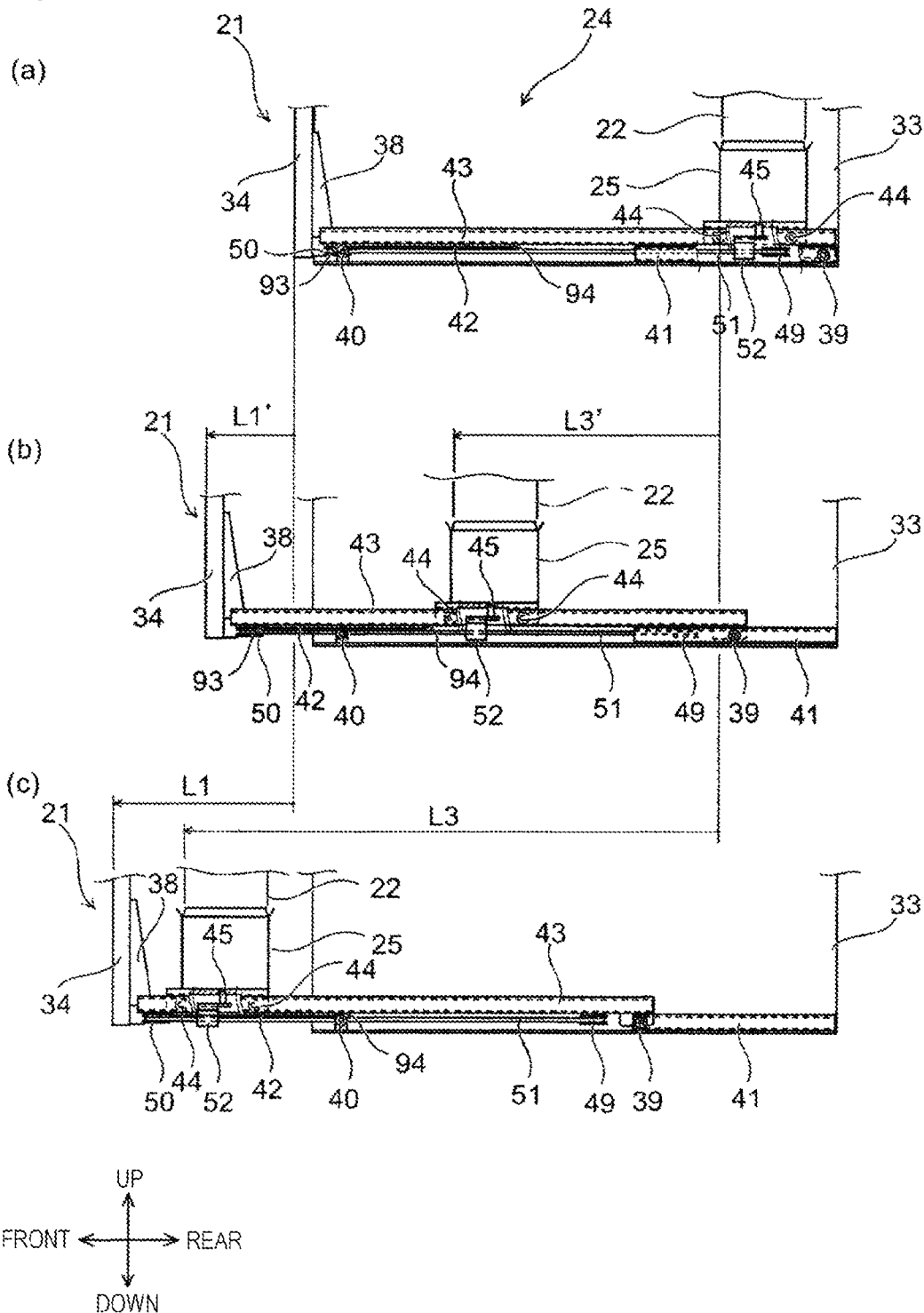

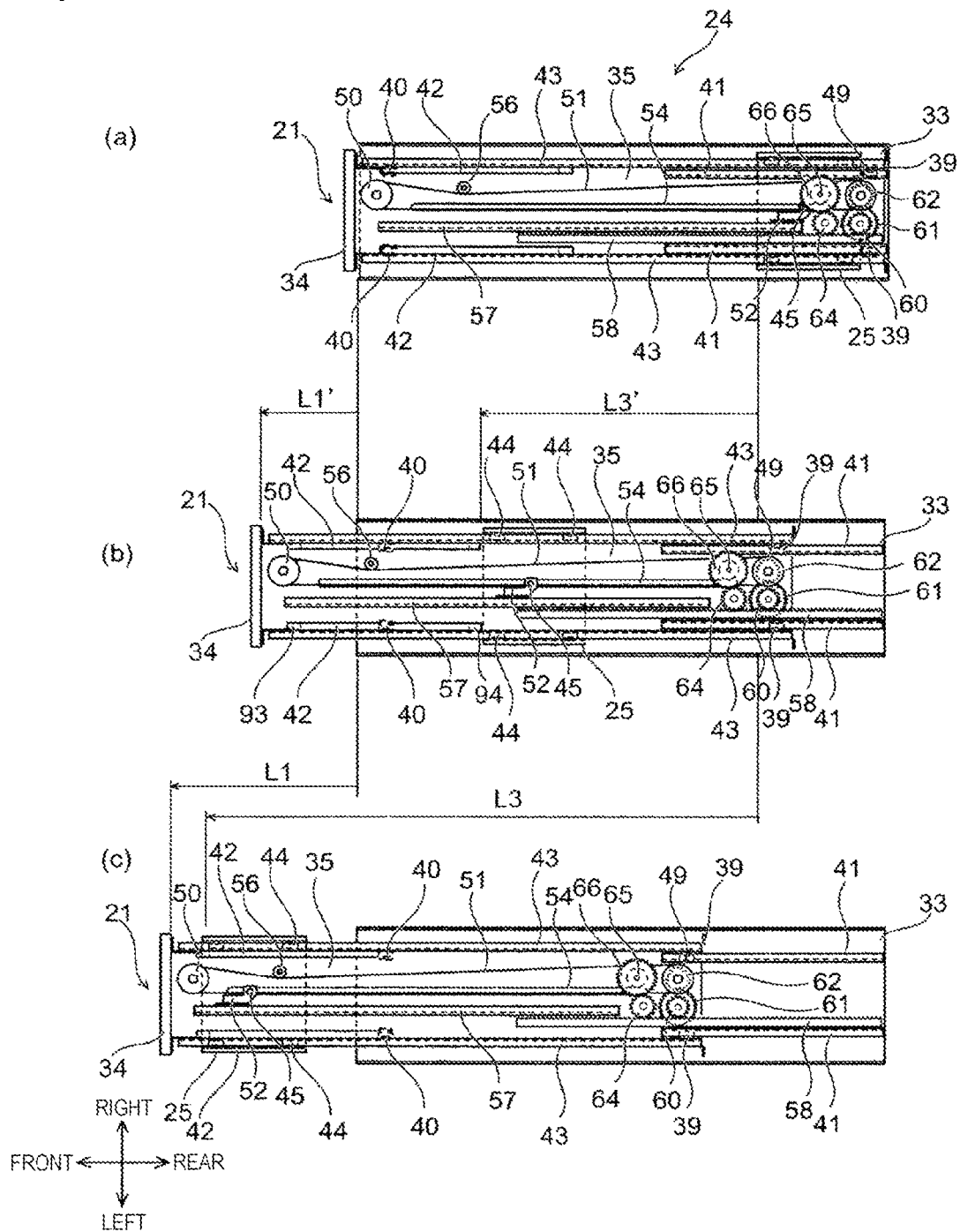
[FIG. 8]

[FIG. 9]
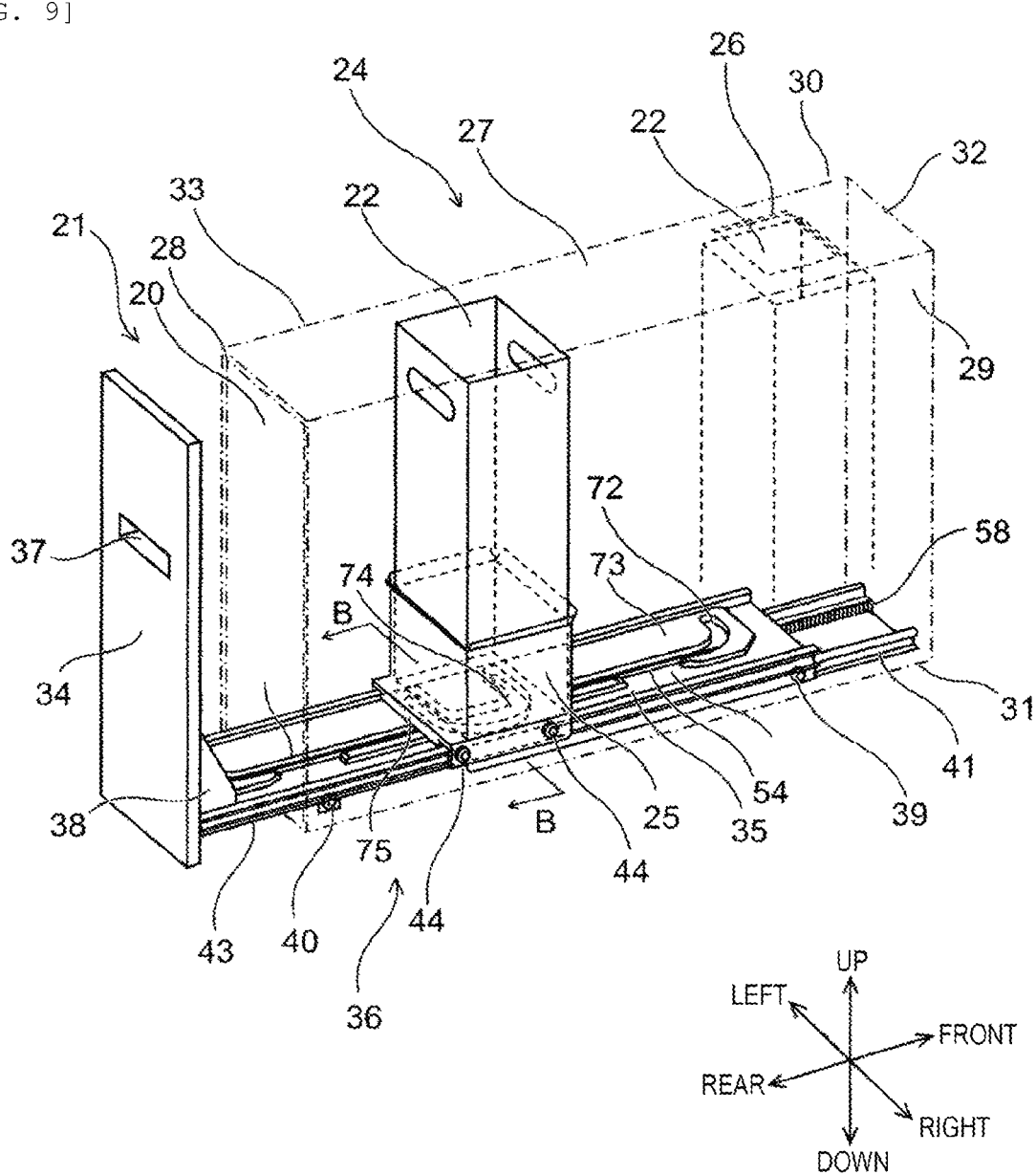

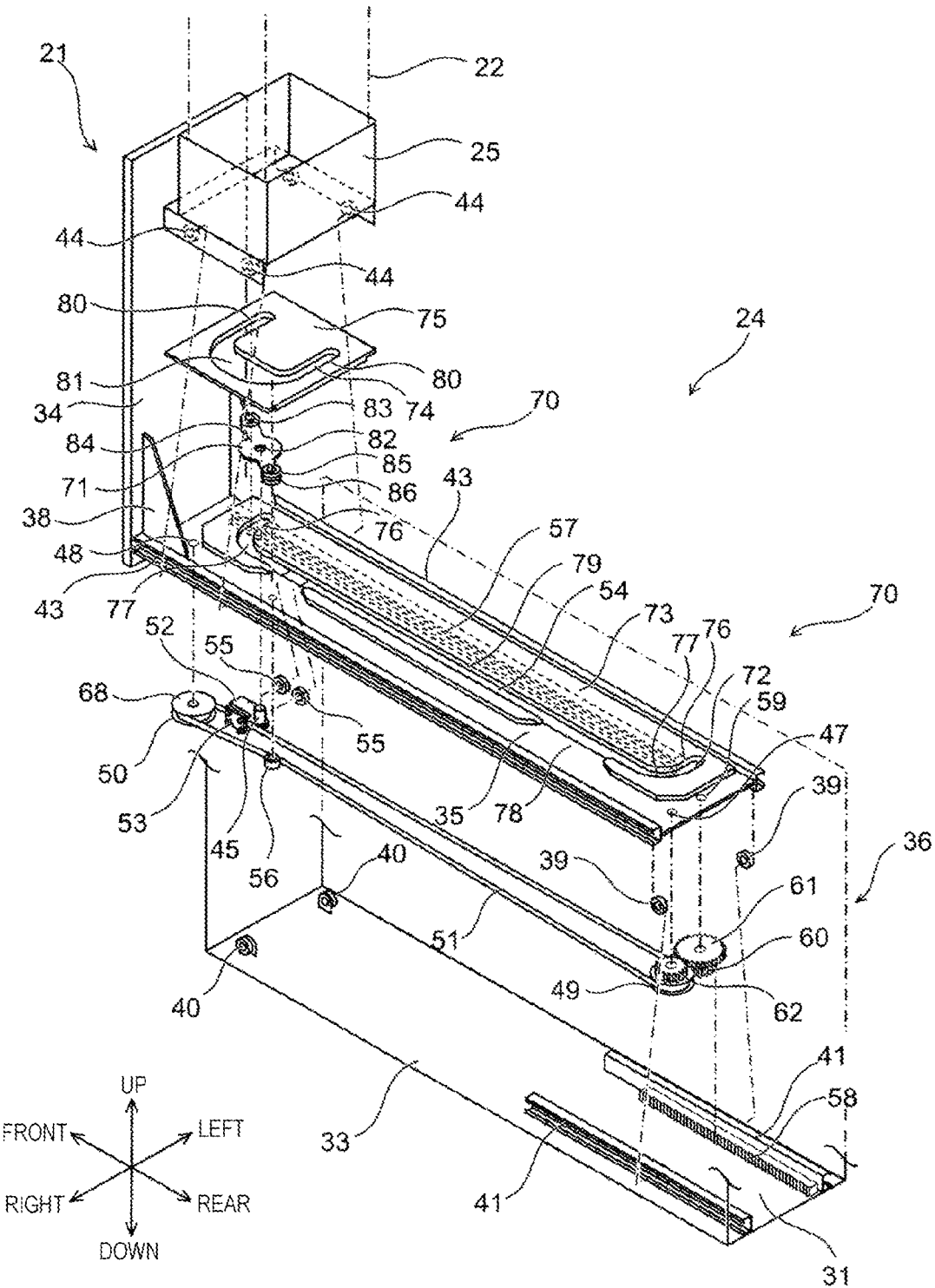
[FIG. 10]

[FIG. 11]
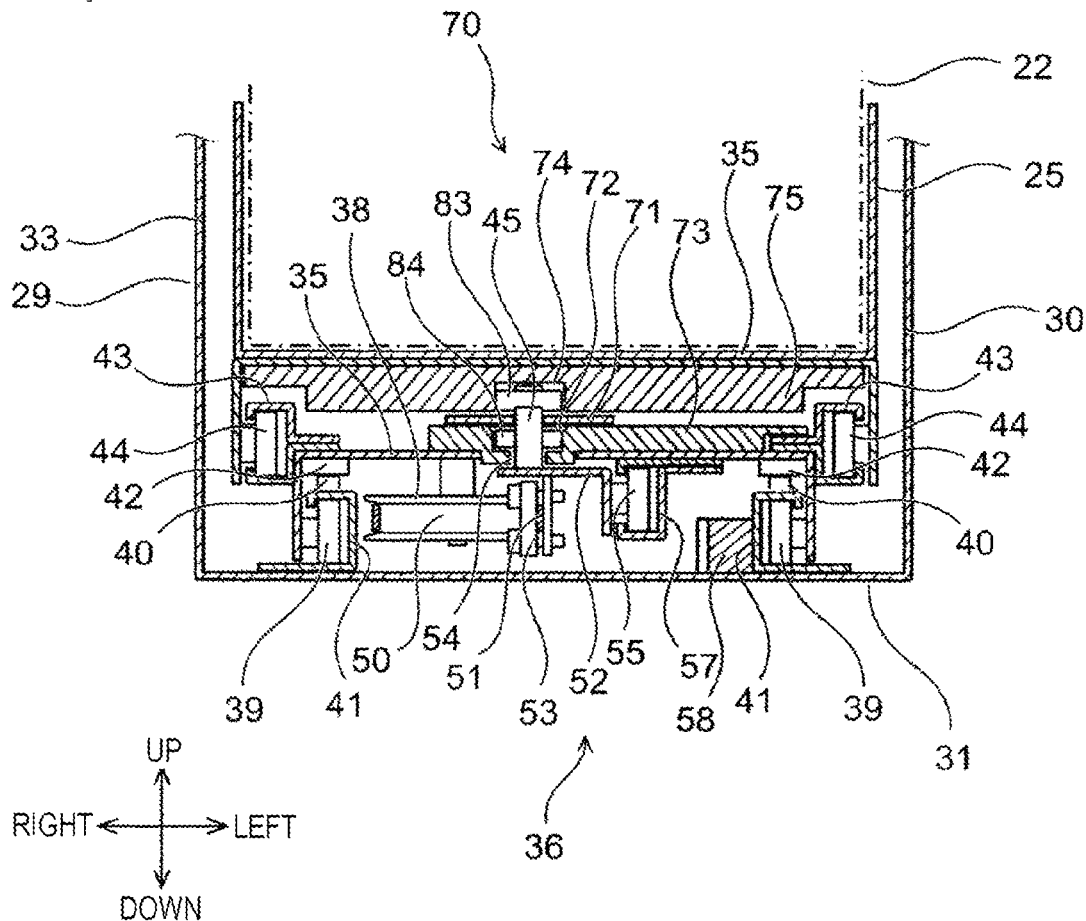
[FIG. 12A]
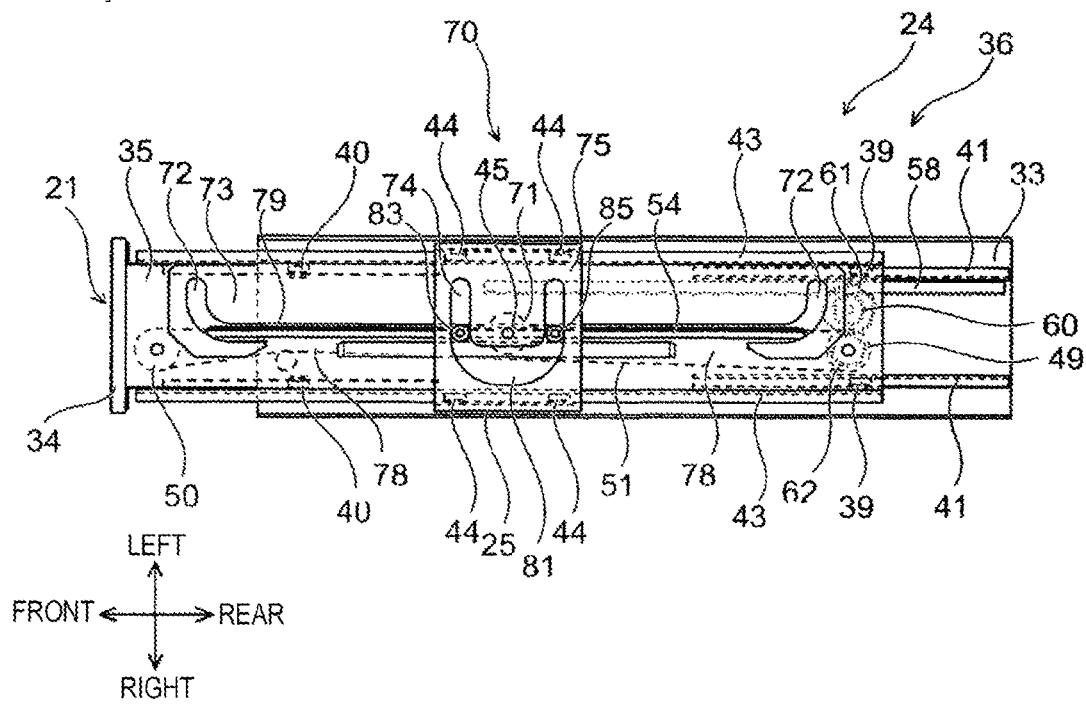

[FIG. 12B]
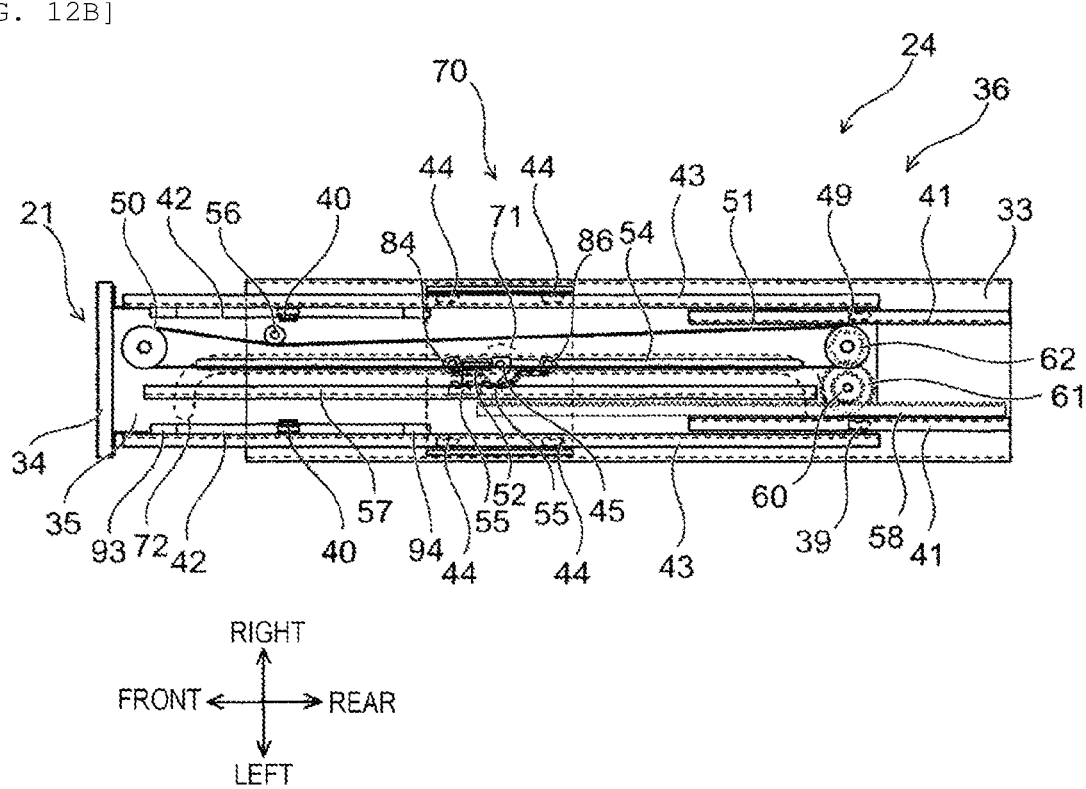

[FIG. 13]
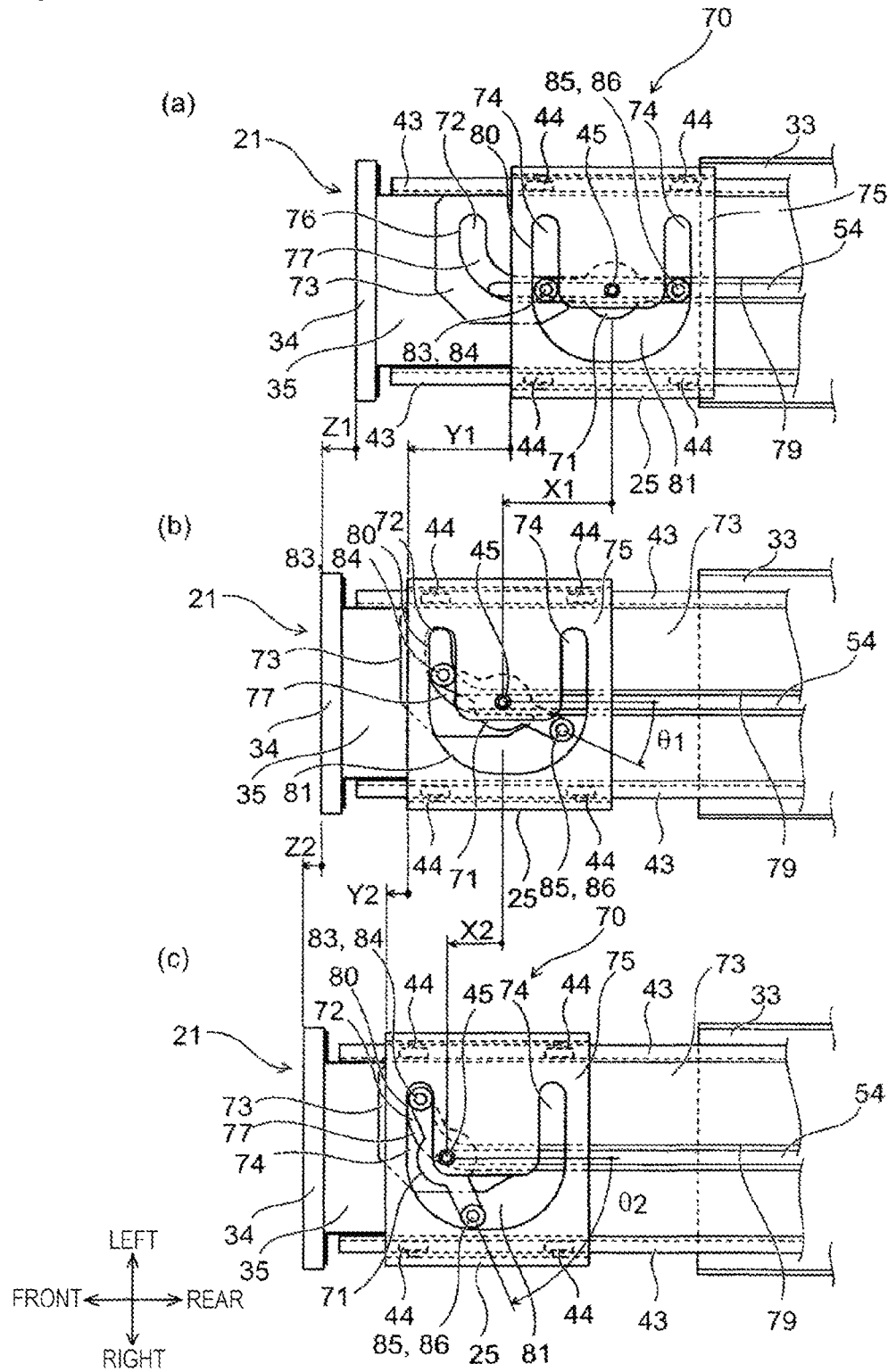

[FIG. 14A]
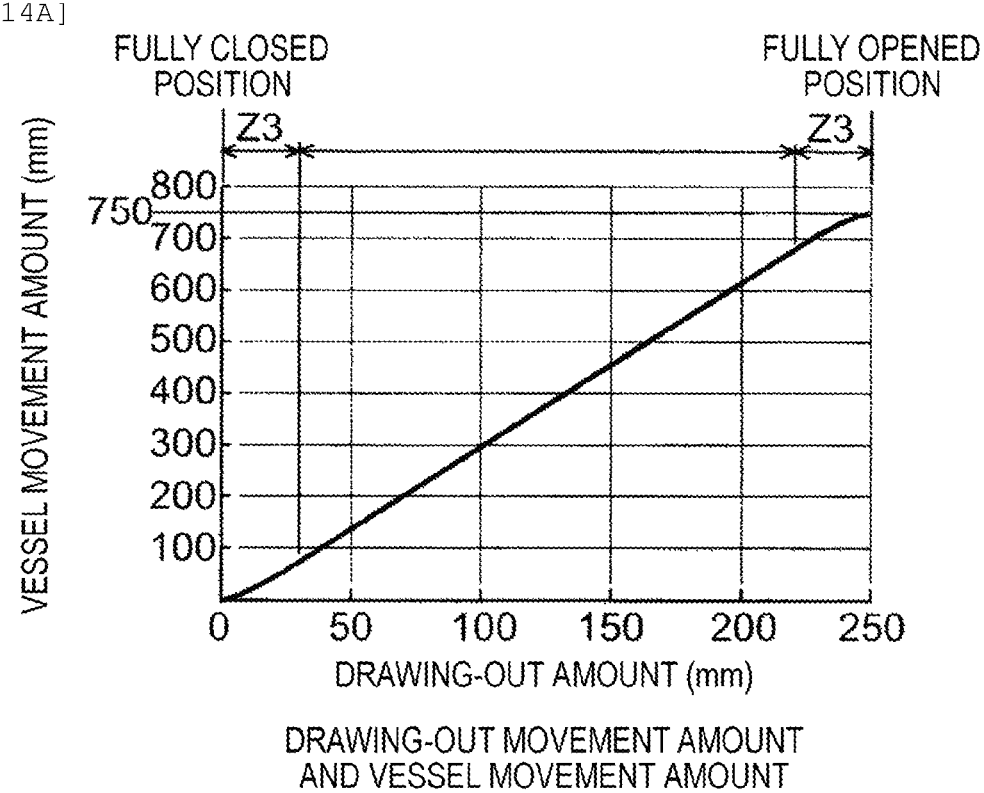
DRAWING-OUT MOVEMENT AMOUNT
AND VESSEL MOVEMENT AMOUNT
[FIG. 14B]
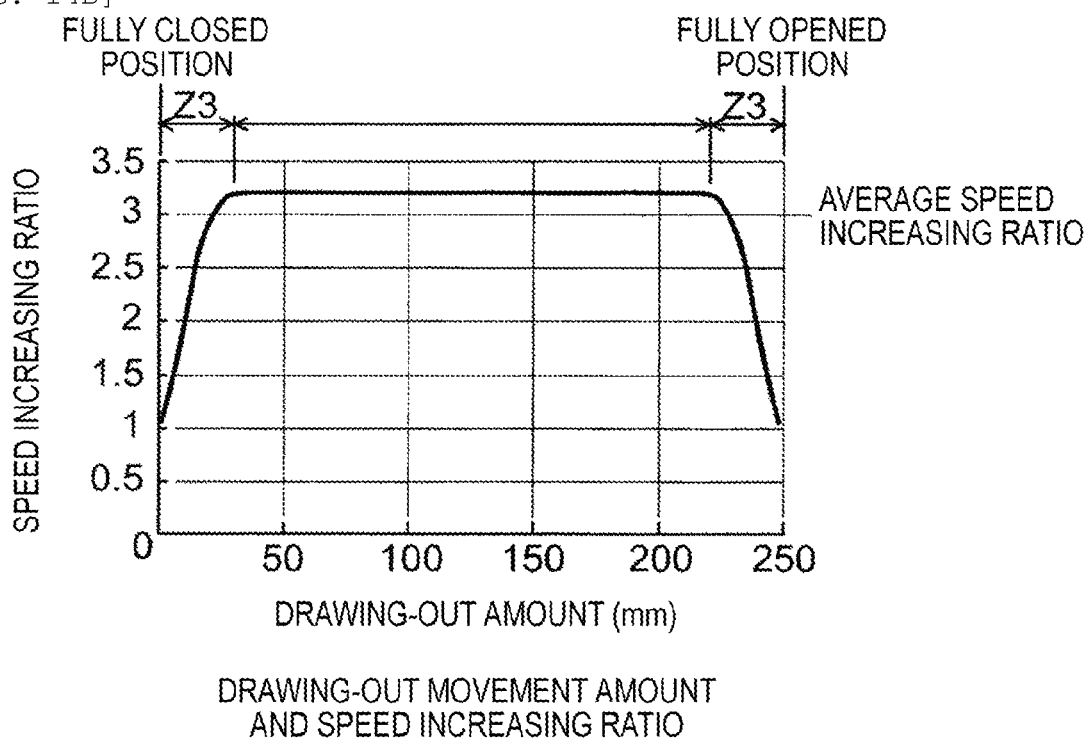
DRAWING-OUT MOVEMENT AMOUNT
AND SPEED INCREASING RATIO

[FIG. 15]
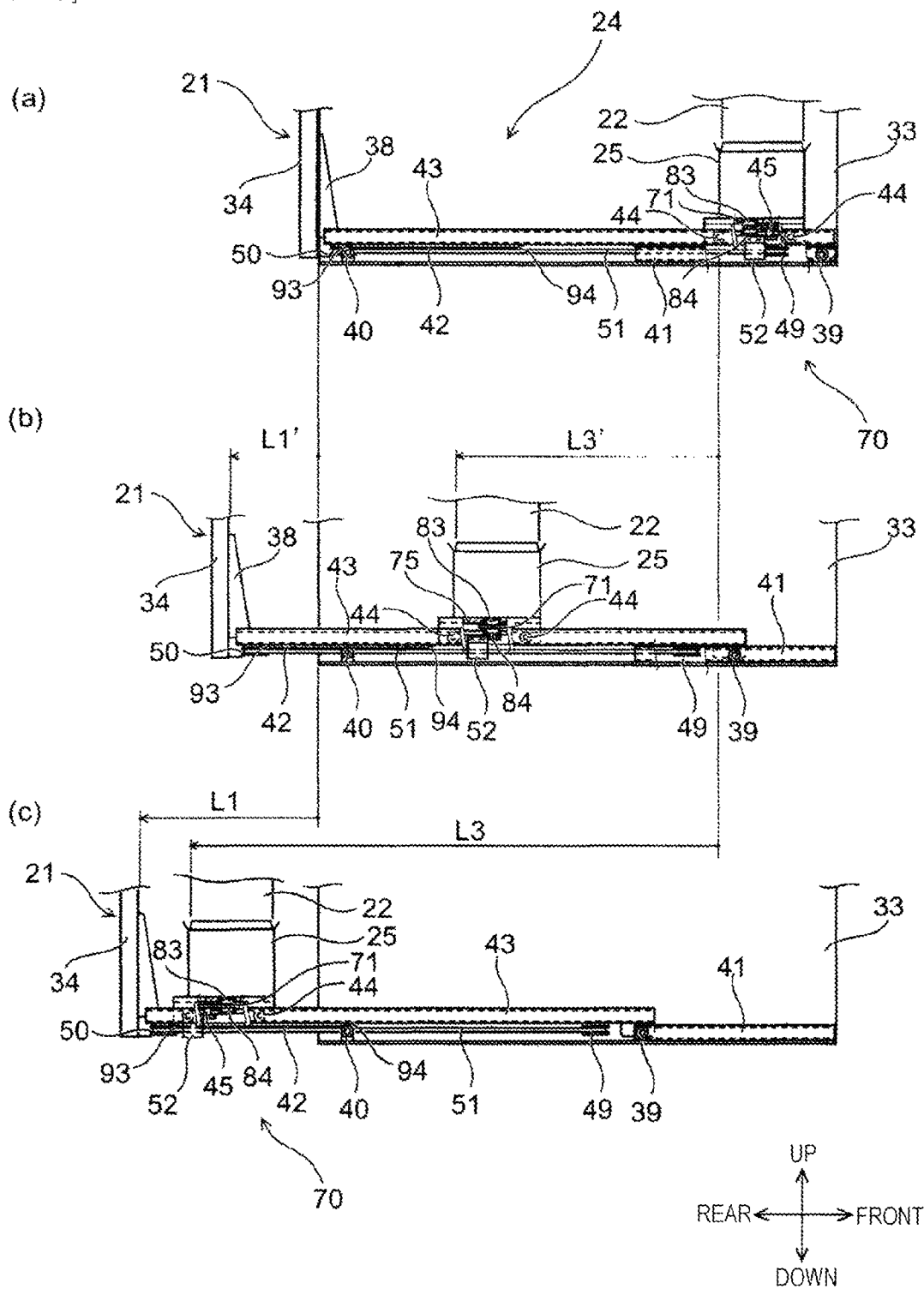

[FIG. 16]
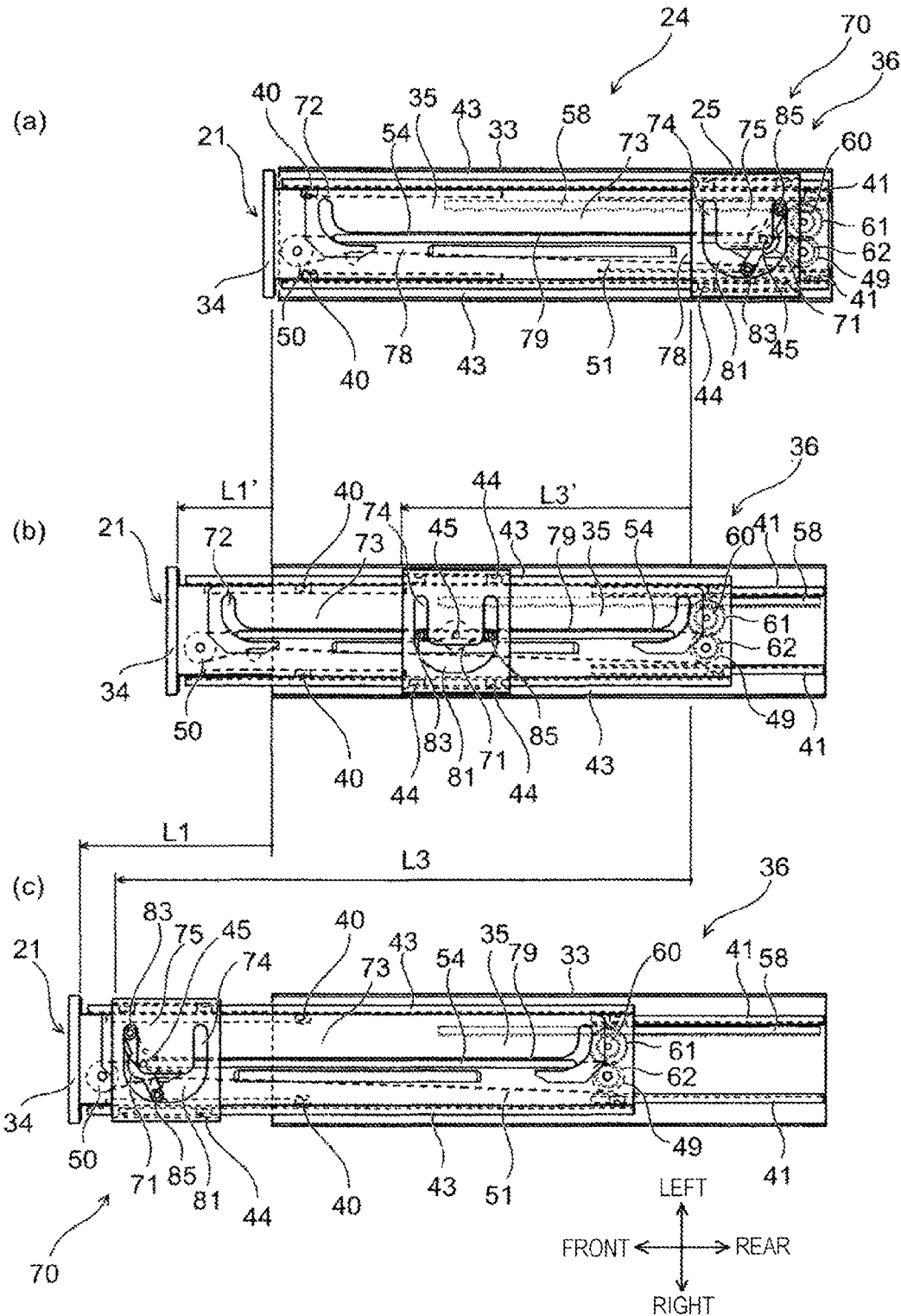

[FIG. 17A]
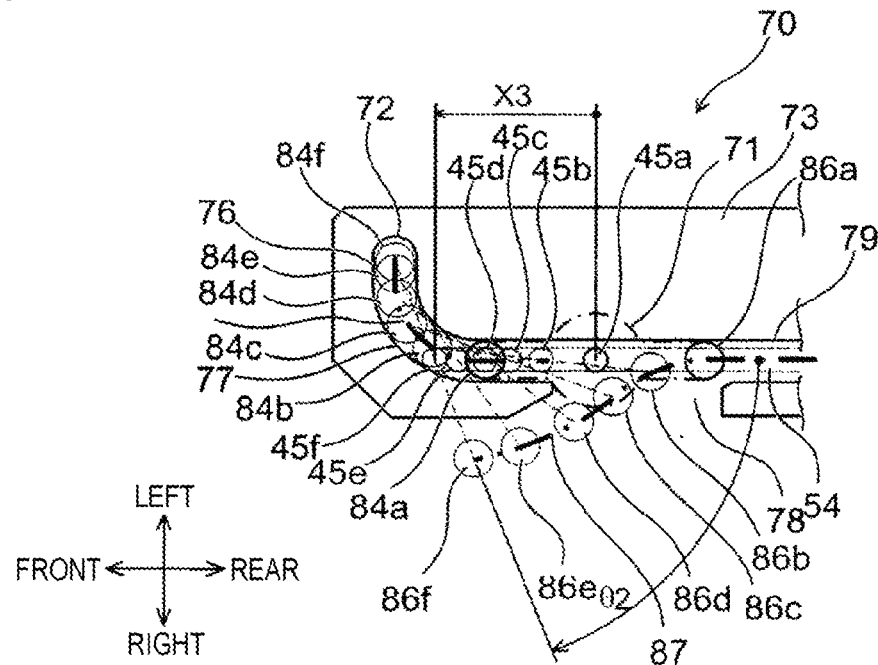
[FIG. 17B]
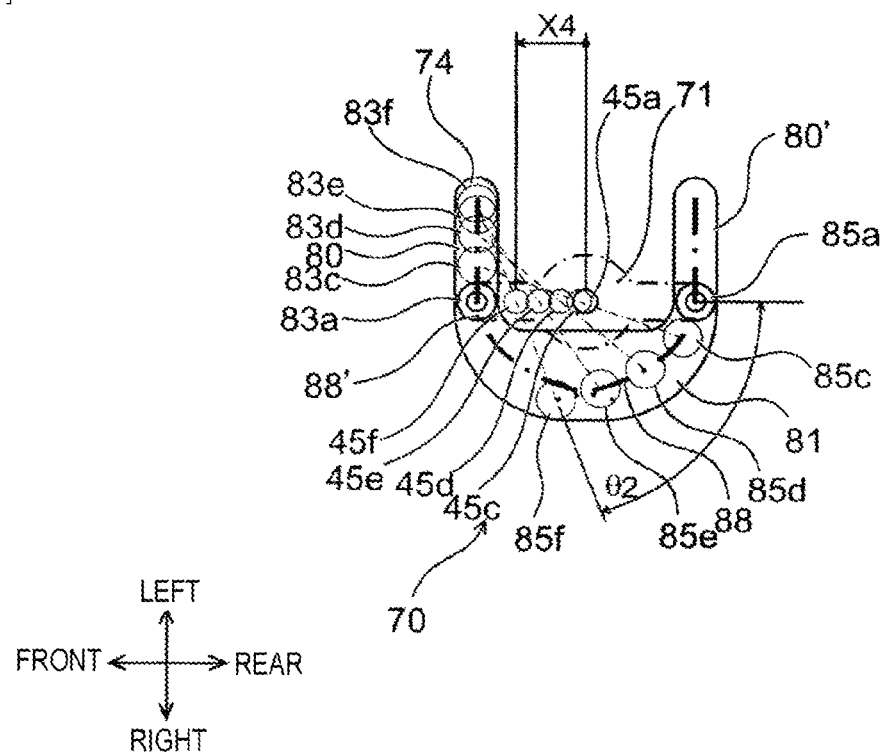

[FIG. 18A]
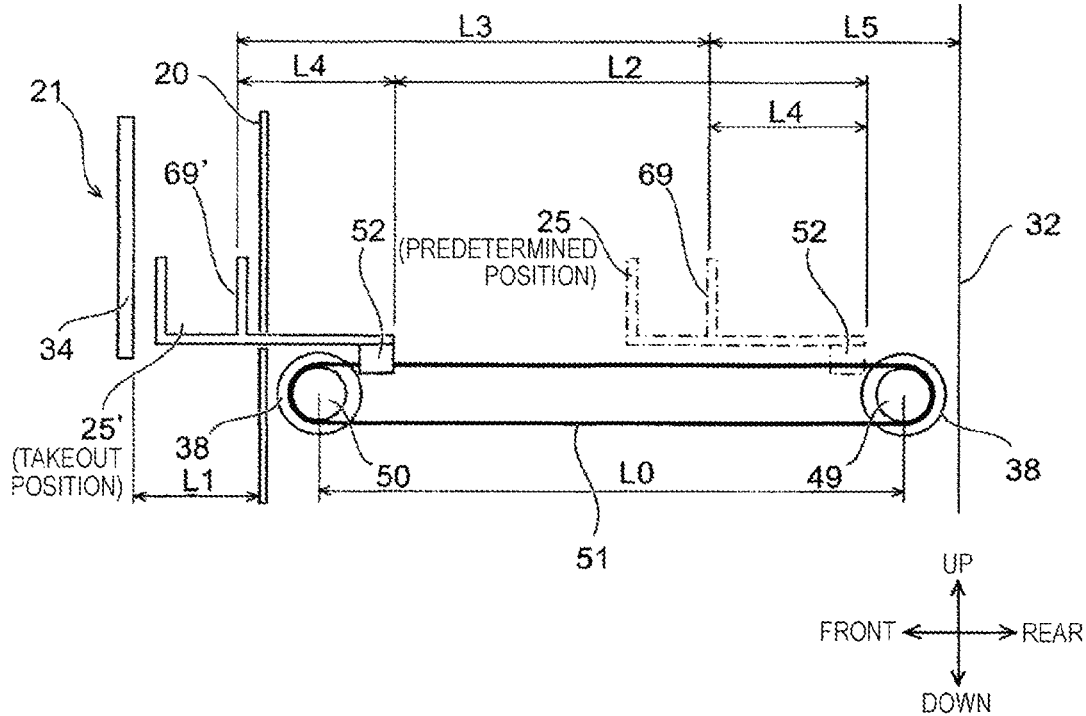
[FIG. 18B]
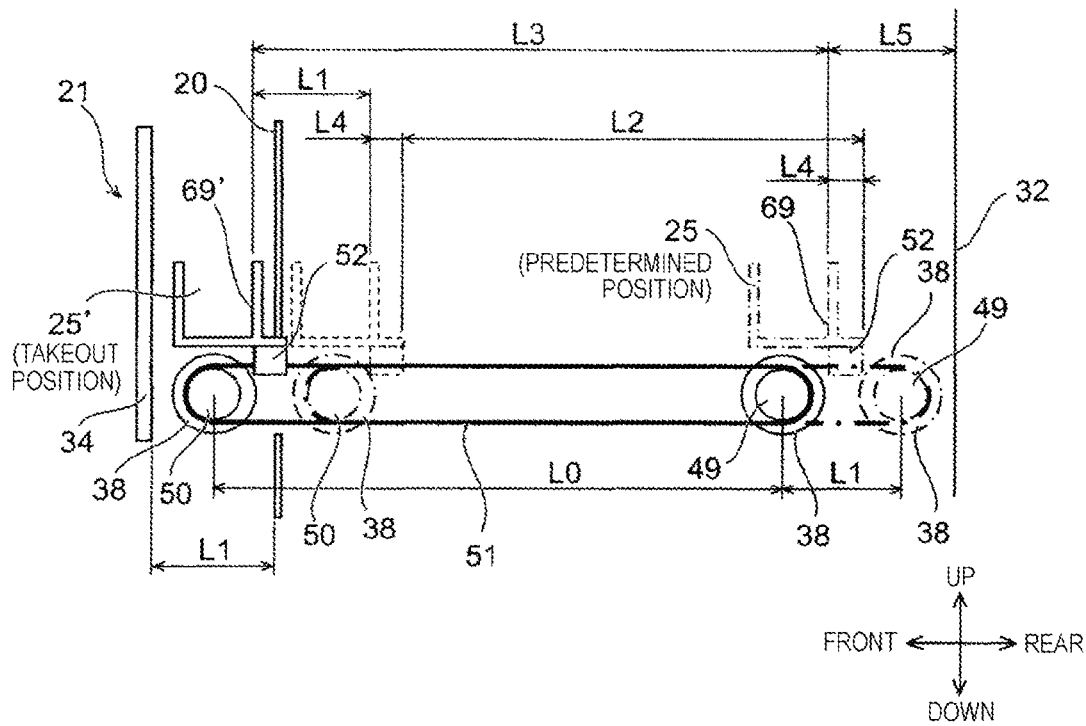

[FIG. 19]
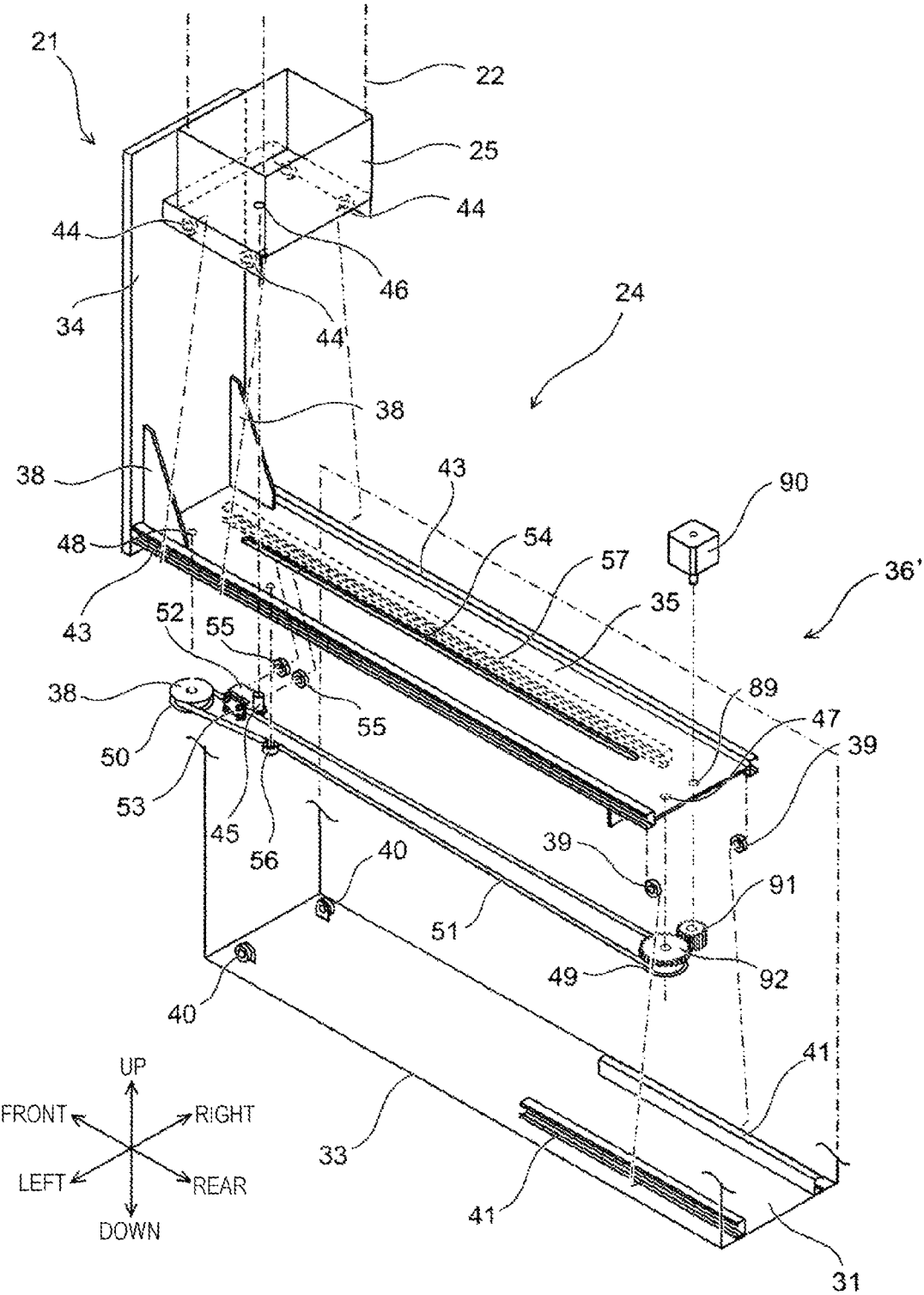

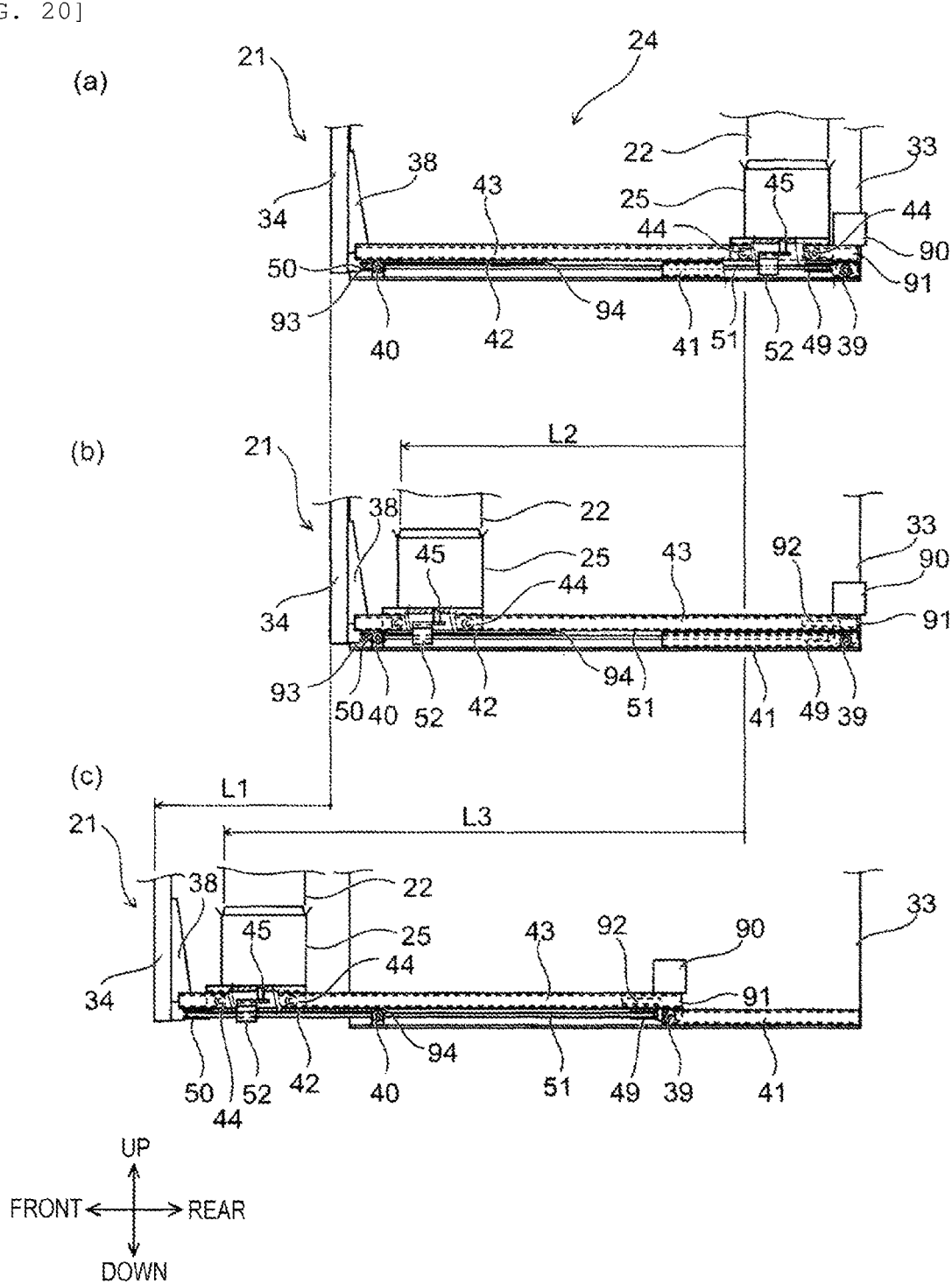

AUTOMATIC ANALYSIS APPARATUS

TECHNICAL FIELD

The present invention relates to an automatic analysis apparatus that performs qualitative or quantitative analysis of biological samples such as blood and urine.

BACKGROUND ART

An automatic analysis apparatus is an apparatus that automatically analyzes biological samples such as blood and the like and outputs the result thereof, and is essential to hospitals or medical examination facilities. This automatic analysis apparatus is required to perform various kinds of examinations within a shorter period of time.

In the automatic analysis apparatus, a sample dispensing tip or a reaction vessel that is a used consumable is put into a disposal box provided at a predetermined position, when a given amount of the sample dispensing tips or the reaction vessels are accumulated, the disposal box is taken out to the outside of the apparatus to dispose the sample dispensing tips or the reaction vessels, and the empty disposal box is reset to the predetermined position in the apparatus. The predetermined position of the disposal box is not limited to the vicinity of a front surface of the automatic analysis apparatus and may be the vicinity of a back surface thereof. When the disposal box is replaced, a configuration in which the disposal box can be easily taken out from the front surface and can be set to the predetermined position is preferable.

An automatic analyzer (automatic analysis apparatus) described in PTL 1 includes: a housing which accommodates an analysis device; a vessel disposed at a predetermined position in the housing; a transport mechanism which transports the vessel from the predetermined position to a vessel takeout position along with the operation of an operating unit provided in the housing; and a speed change mechanism which increases an operation amount of the operating unit and transmits the increased operation amount to the transport mechanism.

CITATION LIST

Patent Literature

PTL 1: WO2011/122562

SUMMARY OF INVENTION

Technical Problem

In the configuration disclosed in PTL 1, the fixing rail is fixed to the housing, and rotational support shafts of a pair of pulleys around which a belt that transports the vessel is wound are fixed to the housing. Therefore, the movement amount of the vessel is less than the distance between the pulleys of the belt, and there is a limit in increasing the movement amount of the vessel. Further, a belt pulley in the vicinity of an opening is arranged inside the housing further than the opening. Therefore, in order to move the vessel to the front side further than the opening for the fully opened state, a protruding overhang portion corresponding to the distance between the belt pulley position on the front side to the vessel position in the fully opened state is required. In this case, the overhang portion protrudes to the rear side further than the vessel for a fully closed state. Therefore, the belt pulley on the rear side is arranged on the rear side further than the overhang portion. That is, a dead space for accommodating the overhang portion to the rear side further than the vessel is required. Therefore, there is a limit in reducing the dimension of a drawer in an operating direction or in a depth direction for a reduction in size.

In addition, since the belt pulley is arranged so as to rotate within a vertical plane, a driving portion provided below the bottom surface of the vessel is required to have a thickness more than or equal to the diameter of the belt pulley. Therefore, there is a limit in reducing the thickness of the driving portion.

In the present invention, a driving mechanism for moving a vessel having a disposal box placed thereon in a front-rear direction the same as an opening/closing direction of a drawer is provided lower than a bottom surface of the vessel. A first rail extended in a movement direction of an operating unit, a second rail extended in a movement direction of the vessel provided in the drawer, and toothed pulleys for rotating a toothed belt within a horizontal plane are arranged. The first rail, the second rail, and the toothed belt are placed side by side without overlapping with each other in a vertical direction. As a result, the thickness of the driving mechanism is reduced, and thus the structure is simple and can realize a reduction in size. Further, the toothed pulleys and the toothed belt are provided in the intermediate moving member that opens or closes in the front-rear direction together with the drawer. Therefore, the overhang portion is reduced, and the movement amount of the vessel can also increase to be more than the distance between the pulleys of the toothed belt. Simply by opening and closing the drawer back and forth, the disposal box can be taken out to the outside through the front opening. Therefore, it is possible to provide an automatic analysis apparatus in which the operation of taking out the disposal box in which used sample dispensing tips or reaction vessels are accumulated can be simply and reliably performed and the structure is simple and can realize a reduction in size.

Solution to Problem

In order to achieve the above-described object, according to the present invention, there is provided an automatic analysis apparatus including: a housing which accommodates an analysis device; a vessel disposed at a predetermined position in the housing; an opening for taking the vessel into/from the housing, which is provided in the housing; an operating unit which is operated to take the vessel into/from the housing via the opening; a transport mechanism which transports the vessel from the predetermined position to a vessel takeout position along with the operation of the operating unit; and a speed change mechanism which reduces an operation amount of the operating unit as compared with a movement amount of the vessel from the predetermined position to the vessel takeout position, in which a movement direction of the operating unit and a movement direction of the vessel are the same when the vessel is taken in/out, and the transport mechanism includes: a first rail which slidably supports the housing and the operating unit and extends in the movement direction of the operating unit; a second rail which slidably supports the operating unit and the vessel and extends in the movement direction of the vessel; a belt which bridges across a pair of pulleys provided in the operating unit to be looped thereover; transmission means for transmitting the operation of the operating unit to a rotation of the pulleys; and a connecting member which moves the vessel along with traveling of the belt.

Advantageous Effects of Invention

According to the present invention, the structure is simple and can realize a reduction in size, and simply by opening and closing a drawer back and forth, a disposal box can be taken out to the outside through a front opening and set to a predetermined position. Therefore, it is possible to provide an automatic analysis apparatus in which the operation of taking out the disposal box in which used sample dispensing tips or reaction vessels are accumulated can be simply and reliably performed.

BRIEF DESCRIPTION OF DRAWINGS

FIG. 1 is a configuration diagram of an automatic analysis apparatus according to a first embodiment of the present invention.

FIG. 2 is a perspective view of the automatic analysis apparatus according to the first embodiment of the present invention.

FIG. 3 is a perspective view of disposal box drawing-out means in the automatic analysis apparatus according to the first embodiment of the present invention, which shows a state of being drawn out.

FIG. 4 is an exploded perspective view of the disposal box drawing-out means in the automatic analysis apparatus according to the first embodiment of the present invention.

FIG. 5 is a cross-sectional view taken along a line A-A of the disposal box drawing-out means in the automatic analysis apparatus according to the first embodiment of the present invention.

FIG. 6A is a top view of the disposal box drawing-out means in the automatic analysis apparatus according to the first embodiment of the present invention.

FIG. 6B is a bottom view of the disposal box drawing-out means in the automatic analysis apparatus according to the first embodiment of the present invention.

FIG. 7 is a side view of the disposal box drawing-out means in the automatic analysis apparatus according to the first embodiment of the present invention, in which (a) shows a fully closed state, (b) shows an opening and closing state, and (c) shows a fully opened state.

FIG. 8 is a top view of the disposal box drawing-out means in the automatic analysis apparatus according to the first embodiment of the present invention, in which (a) shows a fully closed state, (b) shows an opening and closing state, and (c) shows a fully opened state.

FIG. 9 is a perspective view of disposal box drawing-out means in an automatic analysis apparatus according to a second embodiment of the present invention, which shows a state of being drawn out.

FIG. 10 is an exploded perspective view of the disposal box drawing-out means in the automatic analysis apparatus according to the second embodiment of the present invention.

FIG. 11 is a cross-sectional view taken along a line B-B of the disposal box drawing-out means in the automatic analysis apparatus according to the second embodiment of the present invention, which shows a state.

FIG. 12A is a top view of the disposal box drawing-out means in the automatic analysis apparatus according to the second embodiment of the present invention.

FIG. 12B is a bottom view of the disposal box drawing-out means in the automatic analysis apparatus according to the second embodiment of the present invention.

FIG. 13 is a partial top view of the disposal box drawing-out means in the automatic analysis apparatus according to the second embodiment of the present invention, in which (a) shows a deceleration start state, (b) shows a deceleration state, and (c) shows a fully opened state.

FIG. 14A is a graph showing a relationship between a drawing-out movement amount and a movement amount of the disposal box in the disposal box drawing-out means in the automatic analysis apparatus according to the second embodiment of the present invention.

FIG. 14B is a graph showing a relationship of a speed increasing ratio that is a ratio between the drawing-out movement amount and the movement amount of the disposal box in the automatic analysis apparatus according to the second embodiment of the present invention.

FIG. 15 is a side view of the disposal box drawing-out means in the automatic analysis apparatus according to the second embodiment of the present invention, in which (a) shows a fully closed state, (b) shows an opening and closing state, and (c) shows a fully opened state.

FIG. 16 is a top view of the disposal box drawing-out means in the automatic analysis apparatus according to the second embodiment of the present invention, in which (a) shows a fully closed state, (b) shows an opening and closing state, and (c) shows a fully opened state.

FIG. 17A is a schematic view showing a relationship between a swing arm and a first cam groove in the disposal box drawing-out means in the automatic analysis apparatus according to the second embodiment of the present invention.

FIG. 17B is a schematic view showing a relationship between the swing arm and a second cam groove in the disposal box drawing-out means in the automatic analysis apparatus according to the second embodiment of the present invention.

FIG. 18A is a simplified side view showing a configuration in which a toothed belt is provided in a housing in the disposal box drawing-out means in the automatic analysis apparatus according to the present invention.

FIG. 18B is a simplified side view showing a configuration in which the toothed belt is provided in a drawer in the disposal box drawing-out means in the automatic analysis apparatus according to the present invention.

FIG. 19 is an exploded perspective view of disposal box drawing-out means in an automatic analysis apparatus according to a third embodiment of the present invention.

FIG. 20 is a side view of the disposal box drawing-out means in the automatic analysis apparatus according to the third embodiment of the present invention, in which (a) shows a fully closed state, (b) shows an opening and closing state, and (c) shows a fully opened state.

DESCRIPTION OF EMBODIMENTS

Hereinafter, embodiments of the present invention will be described with reference to the drawings.

FIGS. 1 to 8 relate to a first embodiment of the present invention. FIG. 1 is a plan view showing an automatic analysis apparatus including a reagent disk (hereinafter, also referred to as "reagent vessel holder"). FIG. 2 is a perspective view of the automatic analysis apparatus. FIG. 3 is a perspective view of the driving mechanism. FIG. 4 is an exploded perspective view of the driving mechanism. FIG. 5 is a cross-sectional view take along a line A-A showing the driving mechanism means. FIG. 6A is a top view of the driving mechanism. FIG. 6B is a bottom view of the driving mechanism. FIG. 7 is a side view showing an operation of the driving mechanism, and FIG. 8 is a diagram showing a bottom surface of the driving mechanism. In the following description, up, down, left, right, front, and rear directions are based on up, down, left, right, front, and rear directions shown in FIGS. 1 and 2.

FIGS. 1 and 2 shows a basic configuration of an automatic analysis apparatus 1 according to an embodiment.

The automatic analysis apparatus has an external shape of a substantially rectangular parallelepiped housing that covers a substrate, various flow paths, and the like. On a top surface (hereinafter, also referred to as work surface) of the housing, various mechanisms required to analyze a sample are arranged. Examples of the mechanism include a reagent cooling box (hereinafter, also referred to as "reagent vessel container or drum"), a reagent dispensing probe, a sample transport mechanism, a sample dispensing probe, an incubator, a detector, and various probe washing mechanisms. The details of various mechanisms will be described below.

The cylindrical reagent cooling box accommodates a reagent disk 2 that is supported to be rotatable around a vertical axis. The reagent disk holds a plurality of reagent vessels (hereinafter, also referred to as "reagent containers", "reagent bottles", or simply "bottles") on a circumference along the inside of an outer circumferential wall.

The reagent dispensing probe suctions a predetermine amount of a predetermined reagent from each of the reagent bottles 3 using a dispensing pipette and dispenses the suctioned reagent into a reaction vessel. A biological sample such as blood or urine that is transported by sample transport means described below is dispensed by the sample dispensing probe and supplied to the reaction vessel.

The reaction vessel containing a reaction liquid in which the reagent and the sample are mixed is controlled at a predetermined temperature by the incubator to promote a reaction for a predetermined time. After completion of the reaction, physical properties of the reaction liquid are detected by a detector described below. Examples of the physical properties include a light emission amount, an amount of scattered light, an amount of transmitted light, a current value, and a voltage value. However, the present invention is not limited to these examples, and a measurement portion that measures well-known physical properties is applied.

In addition, in the automatic analysis apparatus 1, for example, a safety cover 4 that covers a movable portion and is supported to be openable and closable through a hinge is provided toward the rear side. The safety cover 4 is provided with a so-called interlock (not shown) employing, for example, a solenoid. During an operation of the automatic analysis apparatus 1, the safety cover 4 is closed by applying a current to the solenoid, and the state where the safety cover 4 is closed is maintained. While the automatic analysis apparatus 1 is stopped, the safety cover 4 is openable by releasing the application of a current to the solenoid. Therefore, an operator can replace the reagent bottle 3.

A transport route of the sample to be analyzed will be described. A sample 5a to be analyzed is moved into the automatic analysis apparatus 1 by sample transport means 5 such as a belt conveyor or a rack handler, is transported to sample dispensing means 6 including a dispensing pipette that dispenses the sample, and is dispensed.

A plurality of sample dispensing tips and a plurality of reaction vessels are supplied into the automatic analysis apparatus 1 in a state where they are placed on sample dispensing tip/reaction vessel supply means 7 (hereinafter, also referred to as "tip rack").

The reaction vessels are held from the tip rack 7 by sample dispensing tip/reaction vessel transport means 8 one by one, move up, and are moved to an incubator 9 (also referred to as a "cultivation disk"). The sample dispensing tips 10 are held from the tip rack 7 by the sample dispensing tip/reaction vessel transport means 8 one by one, move up, and are moved to a sample dispensing tip buffer 11.

In order to perform the above-described movement, the sample dispensing tip/reaction vessel transport means 8 is configured to be movable in an X-axis direction (left-right direction), a Y-axis direction (front-rear direction), and a Z-axis direction (up-down direction), and a movement range thereof is a region above a part of the reaction vessel disposal hole 12, the sample dispensing tip buffer 11, the reaction liquid stirring means 13, the tip rack 7, and the incubator 9.

The sample dispensing tip buffer 11 is a buffer in which a plurality of sample dispensing tips 10 are temporarily placed, and the sample dispensing means 6 moves above the sample dispensing tip buffer 11 and holds one of the sample dispensing tips 10.

The disk-shaped incubator 9 that is axially supported to be rotatable around the vertical central axis is configured to engage with a plurality of reaction vessels 14 on a circumference in the vicinity of the outer circumference and can move each of the reaction vessels 14 to a predetermined position by rotating the incubator 9.

The sample dispensing means 6 moves to a region above a sample, suctions the sample into the sample dispensing tip 10, moves the sample to a region above the reaction vessel 14 on the incubator 9, and discharges the sample from the inside of the sample dispensing tip 10 into the reaction vessel 14. Next, the sample dispensing means 6 moves a region above a sample dispensing tip/reaction vessel disposal hole 12 and allows the sample dispensing tip 10 to fall inside the hole to discharge the sample dispensing tip 10.

At a position below the sample dispensing tip/reaction vessel disposal hole 12, that is, a predetermined position, a disposal box 22 in which the disposed sample dispensing tips/reaction vessels are accumulated is provided.

The automatic analysis apparatus 1 includes disposal box drawing-out means 24 including a drawer 21 that is supported to be horizontally movable from a closed position to a fully opened position through a front opening 20 provided on a front surface, can draw the disposal box 22 at the closing position from a predetermined position immediately below the sample dispensing tip/reaction vessel disposal hole 12 to a takeout position (a position of a disposal box 22') in front of the front opening 20, and can close the disposal box 22 from the takeout position to the predetermined position.

At the fully opened position of the drawer 21, the disposal box 22 in which the disposed and used sample dispensing tips/reaction vessels are accumulated is taken out from a disposal box mounting table 25 (hereinafter, also referred to as "vessel"), the empty disposal box 22 is placed on the disposal box mounting table 25, and the drawer 21 is pushed rearward to be closed. As a result, a new empty disposal box 22 can be supplied to the predetermined position of the automatic analysis apparatus 1 through the front opening 20.

Here, the opening amount of the drawer 21 from the closed position to the fully opened position is, for example, 200 mm to 300 mm. When the drawer 21 is fully opened, the takeout of the placed disposal box 22 and the attachment of the empty disposal box 22 can be easily performed.

Next, a transport route of the reagent to be added to the sample in the reaction vessel 14 will be described.

In the cylindrical reagent cooling box having a hollow inside, the reagent disk 2 that is axially supported to be rotatable around the vertical central axis is accommodated. The reagent disk 2 forms a slot that radially holds a plurality of reagent bottles 3 along an outer circumferential wall having a hollow inside, and by rotating the reagent disk 2, each of the reagent bottles 3 is moved to a predetermined position on the circumference. Some of the reagent bottles 3 also include a reagent including a large number of magnetic particles for stirring. In order to control the reagent bottle 3 to a given temperature, the reagent cooling box has a heat insulating function.

In a lid that covers an upper portion of the reagent cooling box 2, a reagent bottle loading port 23 through which the reagent bottle 3 is set to and taken out from the reagent disk 2 is provided. In addition, in the reagent bottle loading port 23, an openable reagent bottle loading port lid (not shown) is provided, and an interlock (not shown) employing a solenoid is provided. As in the safety cover 4, the reagent bottle loading port 23 is locked and closed during the operation of the automatic analysis apparatus 1 and is unlocked to be openable while the automatic analysis apparatus 1 is stopped.

A reagent dispensing pipette 15 is configured to be movable such that it can suction the reagent in the reagent bottle and can move to a predetermined position. First, the reagent dispensing pipette 15 moves to a region above a predetermined kind of reagent on the reagent disk 2 to suction a predetermined amount of the reagent, and then moves to a region above a predetermined reaction vessel 14 on the incubator 9 to discharge the reagent into the reaction vessel 14.

Stirring means 16 for reagent is provided above the reagent cooling box. In the stirring means 16, a magnetic particle stirring arm (also referred to as "stirrer") that is rotatable around the vertical axis is provided. The magnetic particle stirring arm moves to a region above the reagent bottle 3 containing a reagent including magnetic particles to be stirred, lowers magnetic particle stirring means having, for example, a paddle shape or a spiral shape that is provided at a lower end of the magnetic particle stirring arm into the reagent, and rotates the magnetic particle stirring means to stir a magnetic particle solution. In order to prevent the magnetic particles in the solution from naturally precipitating, the magnetic particle stirring arm stirs magnetic particles immediately before dispensing the reagent. After stirring, the magnetic particle stirring arm lifts up to above the reagent bottle 3, moves to a region above washing means 17 containing a washing liquid, lowers into the washing liquid, and rotates the magnetic particle stirring means to remove the magnetic particles attached to the stirring means.

After a predetermined reaction time has elapsed after dispensing the sample and the predetermined reagent, a reaction liquid is formed. This reaction liquid is suctioned from the reaction vessel 14 by a reaction liquid suction nozzle 18 and is supplied to detecting means 19. This detecting means 19 analyzes the reaction liquid. As an analysis method, any well-known method can be used. In addition, the analysis may be performed while holding the reaction liquid in the reaction vessel 14.

Next, the analyzed reaction liquid is moved to a region above the sample dispensing tip/reaction vessel disposal hole 12 by the sample dispensing tip/reaction vessel transport means 8, and the sample dispensing tip 10 is disposed into the sample dispensing tip/reaction vessel disposal hole 12. Depending on the kind of measurement, the reaction vessel may be used multiple times for measurement. In this case, the reaction vessel is washed with washing water after disposing the reaction liquid in the reaction vessel after completion of analysis.

The series of operations of the apparatus are controlled by a host computer 200 as control means.

By combining or repeating the above-described operations, the automatic analysis apparatus can efficiently analyze a plurality of samples regarding a plurality of analysis item.

Embodiment 1

FIG. 3 is a perspective view of the disposal box drawing-out means 24 according to a first embodiment of the present invention. FIG. 4 is an exploded perspective view of the disposal box drawing-out means 24. FIG. 5 is a cross-sectional view take along a line A-A showing the disposal box drawing-out means 24. FIG. 6A is a top view of the disposal box drawing-out means 24. FIG. 6B is a bottom view of the disposal box drawing-out means 24.

In the first embodiment, a driving mechanism 36 (corresponding to a disposal box moving means) that moves the vessel 25 on which the disposal box 22 is placed in a front-rear direction in conjunction with the opening/closing operation of the drawer 21 is provided.

The top surface of the disposal box 22 is an opened substantially rectangular parallelepiped and has, for example, a paper cylindrical structure lined with vinyl. For example, the disposal box 22 is a vertically long box having a width in the left-right direction of about 150 mm, a depth in the front-rear direction of about 120 mm, and a height of about 420 mm.

The disposal box drawing-out means 24 includes a housing 33 including a front plate 28 with the front opening 20, an top plate 27 with 26 top openings at positions corresponding to the sample dispensing tip/reaction vessel disposal hole 12, a right side plate 29, a left side plate 30, a bottom plate 31, and a rear plate 32. A front surface of the disposal box drawing-out means 24 is set as a door body 34 that forms a front surface of the drawer 21 that can be opened and closed in the front-rear direction so as to be configured as one module as a whole.

In the drawer 21, an intermediate moving member 35 that is supported to be movable in the front-rear direction together with the door body 34 is provided to extend in the front-rear direction, and is provided between a bottom surface 31 of the housing 33 and a bottom surface of the disposal box 22. That is, the intermediate moving member 35 is provided in the vicinity of a bottom surface of the disposal box drawing-out means 24.

Driving mechanism 36 that moves the disposal box 22 in the front-rear direction in conjunction with the opening/closing operation of the drawer 21 by a distance more than a movement amount of the drawer 21 is provided between the bottom surface 31 of the housing 33 and a bottom surface of the vessel 25, and the intermediate moving member 35 forms a part of the driving mechanism 36.

The front opening 20 has a dimension that allows the driving mechanism 36 moving in the front-rear direction along with the disposal box 22 and the intermediate moving member 35 to pass therethrough, and the door body 34 is vertically provided at a front end of the intermediate moving member 35 and is configured to cover the front opening 20 when the drawer 21 is fully closed.

That is, the door body 34 is perpendicular to the intermediate moving member 35.

The disposal box 22 is a vertically long box, and the driving mechanism 36 is provided below the disposal box 22. Therefore, the shape of the front opening 20 and the door body 34 is also vertically long and, for example, has a width of about 180 mm and a height of about 480 mm.

As shown in FIG. 2, the door body 34 is provided at a position lower than the work surface of the automatic analysis apparatus 1. Therefore, when the operator stands up to open or close the door body 34, it is preferable that a force in the front-rear direction is applied to the vicinity of an upper end of the door body 34 from the viewpoint of high operability. Accordingly, a handle 37 to which a hand is inserted to open the drawer 21 is provided preferably above the center of the door body 34 in the height direction and more preferably in the vicinity of an upper side of the door body 34. When the vicinity of the upper end of the door body 34 is pushed rearward to close the drawer 21, the operability is high.

On the other hand, the driving mechanism 36 is provided in contact with the bottom plate 31 of the housing 33. Therefore, the intermediate moving member 35 is fixed and attached to the vicinity of the lower end of the door body 34.

Accordingly, when a force in the front-rear direction is applied to the vicinity of the upper end of the door body 34 to open or close the drawer 21, due to moment generated from the center of the attachment portion between the intermediate moving member 35 and the door body 34, the door body 34 is likely to be inclined in the front-rear direction, and rigidity is not likely to be obtained. Therefore, by providing a reinforcement member 38 that maintains a positional relationship in which the intermediate moving member 35 and the door body 34 are perpendicular to each other to improve fixing rigidity between the intermediate moving member 35 and the door body 34, the inclination of the door body 34 in the front-rear direction is inhibited when the opening/closing operation of the drawer 21 is performed, and the automatic analysis apparatus 1 in which the opening/closing operation of the drawer 21 is stable can be provided. In particular, by placing a plurality of reinforcement members 38 side by side in the width direction of the door body 34, rigidity can be further increased, which is preferable.

In the vicinity of a rear end of the intermediate moving member 35, a pair of left and right first support rollers 39 that are axially supported to be rotatable around a rotational shaft in a left-right direction are provided. In the vicinity of the front opening 20 of the bottom plate 31, a pair of left and right second support rollers 40 that are axially supported to be rotatable around the rotational shaft in a left-right direction are provided. A pair of left and right first rails 41 that extend to the front side from the vicinity of the rear plate 32 of the housing 33 are provided, and the first support roller 39 is supported to be movable in the front-rear direction along the first rail 41.

In the intermediate moving member 35, a backing plate 42 that extends in the front-rear direction is provided on a lower surface facing the second support roller 40, and the intermediate moving member 35 is placed on the second support roller 40 to be movable in the front-rear direction through the backing plate 42. In other words, the intermediate moving member 35 is supported to be movable in the front-rear direction between the fully opened position and a fully closed position through the first support roller 39 and the second support roller 40.

The door body 34 is integrated with the intermediate moving member 35. When the operator moves the door body 34 in the front-rear direction, the intermediate moving member 35 also integrally moves between the fully opened position and the fully closed position in the front-rear direction.

The door body 34 is provided with a so-called interlock (not shown) employing, for example, a solenoid. During an operation of the sample dispensing tip/reaction vessel transport means 8, the door body 34 is closed by applying a current to the solenoid, and the state where the door body 34 is closed is maintained.

On left and right side surfaces of the intermediate moving member 35, a pair of second rails 43 and 43 are provided to extend in the front-rear direction.

The vessel 25 is a bottomed box with an open top surface on which the disposal box 22 is placed. In a plan view, the inner circumference of the vessel 25 is much larger than the outer circumference of the disposal box 22, and an appropriate backlash is provided around the disposal box 22. The disposal box 22 is set in the vessel 25 from above and is configured to be removable upward from the vessel 25. Four sides of the opening of the top surface of the vessel 25 have an upwardly open shape and function as a guide when the disposal box 22 is set in the vessel 25.

An interval between a right side and a left side of the vessel 25 is more than the width in the left-right direction of the pair of second rails 43 and 43 provided on the left and right side surfaces of the intermediate moving member 35. The right side and the left side of the vessel 25 extend downward from the bottom surface of the vessel 25, and two pairs of left and right third support rollers 44 facing inward each other are placed side by side in the front-rear direction and are axially supported to be rotatable around the rotational shaft in the left-right direction. The two pairs of left and right third support rollers 44 are supported to be movable in the front-rear direction along the pair of left and right second rails 43 and 43. That is, the vessel 25 is not likely to be inclined because it is supported by the two pairs of left and right third support rollers 44, and is stably supported to be movable in the front-rear direction along the intermediate moving member 35.

Substantially at the center of the bottom surface of the vessel 25 in the left-right direction and in the front-rear direction, a moving pin receiving hole 46 to which a moving pin 45 described below is fitted is formed from below.

In the vicinity of the rear end of the intermediate moving member 35, a first toothed pulley 49 that is axially supported to be rotatable around a rotational shaft A47 provided in the up-down direction is provided. In the vicinity of the front end of the intermediate moving member 35, a second toothed pulley 50 that is axially supported to be rotatable around a rotational shaft B48 provided in the up-down direction is provided. The first toothed pulley 49 and the second toothed pulley 50 are arranged in the front-rear direction, and an endless toothed belt 51 is wound between the first toothed pulley 49 and the second toothed pulley 50.

The toothed belt 51 includes: one side that moves to the front side from the first toothed pulley 49 toward the second toothed pulley 50 when the opening operation of the drawer 21 is performed; and another side as a return side that moves rearward from the second toothed pulley 50 toward the first toothed pulley 49.

A moving member 52 is fixed to one portion in one side on the circumference of the toothed belt 51. For example, the toothed belt 51 is interposed between the moving member 52 and a belt fixing member 53 and is fastened through a screw to be fixed.

One side of the toothed belt 51 to which the moving member 52 is fixed is provided in the vicinity of a sliding groove 54 along the sliding groove 54 provided in the intermediate moving member 35 in the front-rear direction.

When the drawer 21 moves to the front side such that the first toothed pulley 49 and the second toothed pulley 50 rotate in one direction, the moving member 52 fixed to the circumference of the toothed belt 51 is configured to be linearly movable from the vicinity of the first toothed pulley 49 to the vicinity of the second toothed pulley 50 along with the one side of the toothed belt 51.

Conversely, when the drawer 21 moves rearward such that the first toothed pulley 49 and the second toothed pulley 50 rotate in another direction, the moving member 52 fixed to the circumference of the toothed belt 51 is configured to be linearly movable from the vicinity of the second toothed pulley 50 to the vicinity of the first toothed pulley 49 along with the one side of the toothed belt 51.

The cylindrical moving pin 45 is provided to face upward at one end of the moving member 52.

In the moving member 52, two sets of fourth support rollers 55 that are axially supported to be rotatable around the rotational shaft in the left-right direction are arranged in the front-rear direction.

A tension roller 56 that is axially supported to be rotatable abuts against the other side of the toothed belt 51 to apply an appropriate tension to the toothed belt 51.

The sliding groove 54 that extends in the front-rear direction is provided in the intermediate moving member 35, and the moving pin 45 penetrates the sliding groove 54 from below to above and moves in the front-rear direction. The moving pin 45 is movable in a range from a front end to a rear end of the sliding groove 54. When drawer 21 is fully opened, the moving pin 45 abuts against the front end of the sliding groove 54 such that the front end of the sliding groove 54 functions as a stopper. When the drawer 21 is fully closed, the moving pin 45 abuts against the rear end of the sliding groove 54 such that the rear end of the sliding groove 54 functions as a stopper.

That is, the movement amount of the moving member 52 in the front-rear direction is more than or equal to the length of sliding groove 54 in the front-rear direction.

In the intermediate moving member 35, a third rail 57 that extends in the front-rear direction is provided adjacent to the moving member 52, and the fourth support roller 55 that is provided in the moving member 52 and includes the rotational shaft provided in the left-right direction is supported to be movable in the front-rear direction along the third rail 57. That is, the moving member 52 is supported to be movable in the front-rear direction along the intermediate moving member 35.

Since two sets of fourth support rollers 55 are provided in the front-rear direction, the moving member 52 is likely to be inclined and stably operates when moving in the front-rear direction.

A rack 58 as a linear gear is provided along the first rail 41 arranged on the left side and the bottom plate 31 of the housing 33 such that a tooth surface thereof faces toward the right side. In the vicinity of the rear end of the intermediate moving member 35, a first gear 60 that is axially supported to be rotatable around a rotational shaft C59 is provided, and the first gear 60 meshes and rotates together with the rack 58. The second gear 61 has a diameter more than that of the first gear 60 and rotates together with the first gear 60. A third gear 62 has a diameter less than that of the second gear 61 and less than that of the first toothed pulley 49, meshes with the second gear 61, and rotates around the rotational shaft A47 together with the first toothed pulley 49.

When a force in the opening direction is applied to the door body 34 to move the drawer 21 to the front side, the intermediate moving member 35 also moves to the front side such that the rotational shaft A47 and the rotational shaft B48 also move to the front side. Since the rack 58 and the first gear 60 mesh with each other, the first gear 60 and the second gear 61 rotate to the right (clockwise) when seen from the top. Since the third gear 62 and the second gear 61 mesh with each other, the third gear 62 and the first toothed pulley 49 rotate to the left (counterclockwise) when seen from the top. Further, the third gear 62 has a diameter less than that of the second gear 61. Therefore, the third gear 62 rotates at a higher speed than that of the second gear 61.

The first toothed pulley 49 rotates to the left. Therefore, the moving member 52 provided on one side of the toothed belt 51 moves to the front side, and the moving pin 45 provided in the moving member 52 moves to the front side along the sliding groove 54. Since the moving pin 45 and the moving pin receiving hole 46 provided in the vessel 25 are fitted to each other, the vessel 25 moves to the front side.

That is, when the drawer 21 moves to the front side, the toothed belt 51 moves to the front side together with the first toothed pulley 49 and the second toothed pulley 50 so as to rotate at the same time. Therefore, the vessel 25 is moved to the front side at a higher speed through the moving member 52 and the moving pin 45.

When the drawer 21 moves rearward, the toothed belt 51 moves rearward together with the first toothed pulley 49 and the second toothed pulley 50 so as to rotate at the same time. Therefore, the vessel 25 is moved rearward at a higher speed through the moving member 52 and the moving pin 45.

The first toothed pulley 49, the second toothed pulley 50, and the toothed belt 51 are provided in the intermediate moving member 35 that is opened or closed in the front-rear direction together with the drawer 21. Therefore, the movement amount of the vessel 25, that is, the distance between the predetermined position of the disposal box 22 and the takeout position of the disposal box 22' is equal to the movement amount of the moving member 52 provided in the toothed belt 51, which is the sum of the movement amount of the drawer 21 and the length of the sliding groove 54. Therefore, this configuration is preferable from the viewpoint that the movement amount of the vessel 25 can increase.

A fourth gear 64 that is axially supported to be rotatable around a rotational shaft D63 provided in the intermediate moving member 35 is provided, and the fourth gear 64 meshes and rotates together with the rack 58. A fifth gear 66 is provided in a rotational shaft of a rotary damper 65. When the fifth gear 66 is rotated in a state where the rotary damper 65 is fixed, a resistance torque is generated due to the influence of viscous resistance caused by, for example, high-viscosity silicone oil sealed in the rotary damper 65.

The rotary damper 65 is fixed by a screw through a rotary damper fixture hole 67 provided in the intermediate moving member 35. The fifth gear 66 meshes and rotates together with the fourth gear 64. Therefore, when the drawer 21 moves to the front side, the rotational shaft D63 moves to the front side, and the rack 58 and the fourth gear 64 mesh with each other. Thus, when seen from the top, the fourth gear 64 rotates to the right, the fifth gear 66 rotates to the left, and a viscous resistance torque is generated in the rotary damper 65.

When the drawer 21 moves rearward, the rotational shaft D63 moves rearward, and the rack 58 and the fourth gear 64 mesh with each other. Thus, when seen from the top, the fourth gear 64 rotates to the left, the fifth gear 66 rotates to the right, and a viscous resistance torque is generated in the rotary damper 65.

That is, irrespective of whether the drawer 21 moves to the front side or to the rear side, a viscous resistance is generated in the rotary damper 65. The details of this configuration will be described below.

The arrangement of the rails and the rollers that form the driving mechanism 36 provided between the bottom surface of the vessel 25 and the bottom plate 31 of the housing 33 will be described with reference to the A-A cross-sectional view of FIG. 5 and appropriately FIGS. 3, 4, 6A, 6B, and 7. The internal width of the vessel 25 in the left-right direction is set to be wider than the width of the disposal box 22 to be set by, for example, about 2 to 3 mm, and the disposal box 22 is configured to be taken from or into above.

The inner interval between the left side plate 30 and the right side plate 29 of the housing 33 is slightly wider than the outer width of the vessel 25 in the left-right direction, and when the vessel 25 and the disposal box 22 moves from the predetermined position to the takeout position in the front-rear direction, the arrangement is performed with backlash for allowing a position error in the left-right direction.

In order to reduce the width of the housing 33 in the left-right direction for a reduction in size, it is desirable that the rails and the rollers that slidably support the vessel 25 in the front-rear direction is arranged inside the vessel 25 so as not to protrude from the outside of the vessel 25 in the left-right direction, and it is desirable that the vessel 25 is supported to be stably movable in the front-rear direction when sliding.

Therefore, in the embodiment, the two pairs of third support rollers 44 and 44 are provided inside left and right side surfaces of the vessel 25, and the pair of second rails 43 and 43 that slide with the third support rollers 44 and 44 are provided along left and right sides of the intermediate moving member 35.

The pair of left and right first support rollers 39 and 39 that support the vicinity of the rear end of the intermediate moving member 35 are provided inside and below the left and right sides of the intermediate moving member 35, and the pair of left and right first rails 41 and 41 that slide with the first support rollers 39 and 39 are provided above the bottom plate 31 of the housing 33.

Further, the pair of backing plates 42 and 42 are provided below the inside of the left and right sides of the intermediate moving member 35 to be close to the front side, and the pair of left and right second support rollers 40 and 40 that support a front portion of the intermediate moving member 35 through lower surfaces of the backing plates 42 and 42 are provided in the vicinity of a front end of the bottom plate 31 of the housing 33.

Substantially at the center of the intermediate moving member 35 in the left-right direction, the moving pin 45 and the moving pin receiving hole 46 of the vessel 25 are provided.

In the pair of left and right first rails 41 and 41, the first toothed pulley 49, the second toothed pulley 50, and the toothed belt 51 are provided on one side in the left-right direction with respect to the moving pin 45, and the third rail 57 and the fourth support roller 55 are provided on another side in the left-right direction with respect to the moving pin 45.

By providing the rotational support shafts of the first toothed pulley 49 and the second toothed pulley 50 in the vertical direction, the first toothed pulley 49 and the second toothed pulley 50 rotate within a horizontal plane. Therefore, the up-down direction is a thickness direction of the first toothed pulley 49 and the second toothed pulley 50, and the first toothed pulley 49 and the second toothed pulley 50 can be made to be less than the diameter of the first toothed pulley 49 and the second toothed pulley 50, which is the sum of the width of the toothed belt 51 and the thickness of a flange 68 for preventing a belt provided in the first toothed pulley 49 and the second toothed pulley 50 from being separated. That is, the dimension in the horizontal plane is required to be more than or equal to the diameter of the flange 68 of the first toothed pulley 49 and the second toothed pulley 50, but the thickness dimension in the up-down direction is small. Therefore, the driving mechanism 36 can be made to be thin.

Further, the rack 58 is provided between the third rail 57 and the first rail 41 along the first rail 41 such that the tooth surface faces the third rail 57.

The first gear 60 meshing with the rack 58, the second gear 61, and the third gear 62 meshing with the second gear 61 are also provided between the pair of left and right first rails 41 and 41.

That is, the rails, the toothed belt 51, and the like that extend in the front-rear direction are placed side by side in the left-right direction without overlapping each other in the up-down direction. Therefore, the driving mechanism 36 can be made thin, and the size in the height direction can be reduced.

Further, by providing all the rails on the inside further than the left and right side surfaces of the vessel 25, the width of the housing 33 can be prevented from increasing, and a reduction in size can be realized.

In addition, the moving pin 45 and the moving pin receiving hole 46 of the vessel 25 are arranged along the sliding groove 54 substantially at the center in the left-right direction. Therefore, when the drawer 21 and the vessel 25 move in the front-rear direction, a force in the front-rear direction is applied to substantially the center with respect to the vessel 25, and thus the vessel 25 stably moves in the front-rear direction for the opening/closing operation. Since the opening/closing operation of the vessel 25 is stably performed, a gap between the left and right side surfaces of the vessel 25 and the left and right side surfaces of the housing 33 can be reduced to be, for example, about 2 to 5 mm, the width of the housing 33 can be reduced, and a reduction in size can be realized.

The rear end of the rack 58 is provided close to the rear plate 32 of the housing 33. Further, when the rotational shaft of the second gear 61 that rotates together with the first gear 60 as a pinion meshing with the rack 58 and the rotational shaft of the third gear 62 and the first toothed pulley 49 that mesh and rotate together with the second gear 61 are arranged side by side along a rear side of the intermediate moving member 35, the outer circumferences of the second gear 61 and the first toothed pulley 49 can be arranged close to the rear plate 32. Further, when the outer circumference of the second toothed pulley 50 is provided in the vicinity of the front end of the intermediate moving member 35 to be close to the door body 34, an interval between the first toothed pulley 49 and the second toothed pulley 50 can increase. Therefore, the moving distance of the moving member 52 by the toothed belt 51 increases, and the moving distance in the front-rear direction of the vessel 25 or the disposal box 22 placed on the vessel 25 can increase, which is preferable.

The pair of left and right backing plates 42 and 42 provided downward inside the left and right sides of the intermediate moving member 35 correlate to the pair of left and right first support rollers 39 and 39 that are rotatably fixed to bottom plate 31 of the housing 33, the length of the backing plates 42 and 42 in the front-rear direction is more than an operation stroke between the fully opened position and the fully closed position of the drawer 21, and the backing plate 42 is placed on the first support rollers 39 and 39 during the opening/closing operation.

Here, when the drawer 21 is positioned at the fully closed position, the first support roller 39 is positioned in the vicinity of the front end of the backing plate 42 as shown in (a) of FIG. 7. When the drawer 21 is positioned at the fully opened position, the first support roller 39 is positioned in the vicinity of the rear end of the backing plate 42 as shown in (c) of FIG. 7. In an opening and closing state, the first support roller 39 is positioned between the front end and the rear end of the backing plate 42 as shown in (b) of FIG. 7.

Here, on the front end side of the backing plate 42, a first slope 93 that is inclined such that the thickness in the up-down direction decreases toward the front side is provided. On the rear end side of the backing plate 42, a second slope 94 that is inclined such that the thickness in the up-down direction decreases toward the rear side is provided. Further, when the drawer 21 is positioned at the fully opened position, the first support roller 39 is positioned in a range of the first slope 93 of the backing plate 42. When the drawer 21 is positioned at the fully closed position, the first support roller 39 is positioned in a range of the second slope 94 of the backing plate 42.

When the closing operation of the drawer 21 is performed from the opened state, the positional relationship in which the first slope 93 provided at the front end of the backing plate 42 in the vicinity of the fully closed position is placed on the first support roller 39 is satisfied. Therefore, due to the weight of the vessel 25 and the intermediate moving member 35, the first support roller 39 receives a component force from the first slope 93 of the backing plate 42 to the rear side, and the component force is a force in the direction in which the closing operation of the drawer 21 is performed.

That is, the closing operation of the drawer 21 is performed toward the fully closed position due to the weight thereof. Further, in a state where the moving pin 45 abuts against the rear end of the sliding groove 54 in the fully closed state, the first support roller 39 receives a component force from the first slope 93 of the backing plate 42 to the rear side, and thus the drawer 21 receives a force in a direction in which the closing operation of the drawer 21 is further performed. Therefore, the drawer 21 is stably maintained at the fully closed position.

When the opening operation of the drawer 21 is performed, the positional relationship in which the second slope 94 provided at the rear end of the backing plate 42 in the vicinity of the fully opened position is placed on the first support roller 39 is satisfied. Therefore, due to the weight of the vessel 25 and the intermediate moving member 35, the first support roller 39 receives a component force from the second slope 94 of the backing plate 42 to the front side, and the component force is a force in the direction in which the drawer 21 is further opened.

That is, the opening operation of the drawer 21 is performed toward the fully opened position due to the weight thereof. Further, in a state where the moving pin 45 abuts against the front end of the sliding groove 54 in the fully opened state, the first support roller 39 receives a component force from the second slope 94 of the backing plate 42 to the front side, and thus the drawer receives a force in a direction in which the opening operation of the drawer is further performed. Therefore, the drawer is stably maintained at the fully opened position.

While the first slope 93 or the second slope 94 is placed on the first support roller 39, the drawer receives a component force due to the weight of the vessel 25 and the intermediate moving member 35. Accordingly, when the drawer 21 starts the closing operation from the fully opened position, a force to close the drawer 21 increases by the component force due to the weight of the drawer 21, and the force to close the drawer 21 decreases after the first support roller 39 is separated from the second slope 94. Therefore, when the drawer 21 starts the closing operation, a slight clicking feeling can be imparted, and the operability is high.

Further, when the drawer 21 starts the opening operation from the fully closed position, a force to open the drawer 21 increases by the component force due to the weight of the drawer 21, and the force to open the drawer 21 decreases after the first support roller 39 is separated from the first slope 93. Therefore, when the drawer 21 starts the opening operation, a slight clicking feeling can be imparted, and the operability is high.

In other words, the slope is provided at each of the front end and the rear end of the backing plate 42 such that the first support roller 39 is arranged to be positioned on the slope when the drawer 21 is fully opened or fully closed. Therefore, the drawer 21 in the fully opened state or in the fully closed state is stable in the front-rear direction.

When the opening/closing operation of the drawer 21 is performed, the movement amount of the drawer 21 and the movement amount of the vessel 25 will be described.

In a case where the pitch circle diameter of the first gear 60 meshing with the rack 58 is represented by D1, when the drawer 21 is drawn by $L1=\pi \times D1$, the first gear 60 rotates once, and the second gear 61 also rotates once together. When a ratio of the number of teeth in the second gear 61 to the number of teeth in the third gear 62 is represented by Z1 (>1), the third gear 62 rotates by Z1. That is, the first toothed pulley 49 also rotates by Z1. When the diameter of the first toothed pulley 49 is represented by D2, the feed amount of the outer circumference of the toothed belt 51 is represented by $L2=Z1 \times D2 \times \pi$. A movement amount L3 of the vessel 25 is the sum of the movement amount L1 of the drawer 21 and the feed amount L2 of the outer circumference of the toothed belt 51. Therefore, $L3=L1+L2$.

Here, for example, assuming that the maximum drawing-out amount of the drawer 21 is 250 mm and the movement amount of the vessel 25 at this time is 750 mm, a ratio thereof is 1:3, L1: L3=1:3, and the speed increases three times. Here, since $L3=L1+L2$, the numbers of teeth in the first gear 60, the second gear 61, the third gear 62, and the first toothed pulley 49 may be appropriately set such that L1: L2=1:2.

The opening operation of the drawer 21 and the moving operation of the vessel 25 in the first embodiment will be described using FIGS. 7 and 8.

In FIGS. 7 and 8, (a) shows the fully closed state of the drawer 21, in which the disposal box 22 is positioned at a predetermined position immediately below the reaction vessel disposal hole 12. (c) shows the fully opened state of the drawer 21, in which the disposal box 22 is positioned in front of the front opening 20 to be close to the door body 34 of the drawer 21, the disposal box 22 into which used consumables are put can be taken out, and the empty disposal box 22 can be placed on the vessel 25. (b) shows the opening and closing state in which the drawer is positioned between the fully opened position and the fully closed position.

In the fully closed state of (a), the intermediate moving member 35 in which the pair of second rails 43 and 43 are provided on the left and right sides is positioned to be moved to the rearmost side, and the rear end of the intermediate moving member 35 is positioned to be close to the rear plate 32 of the housing 33. The moving member 52 fixed to a part of the toothed belt 51 is positioned at the rearmost position close to the first toothed pulley 49. The vessel 25 on which the disposal box 22 is placed is positioned at the rearmost position, and this position is the predetermined position immediately below the reaction vessel disposal hole 12. The first slope 93 of the backing plate 42 is placed on the second support rollers 40 and 40, and by applying a component force to the drawer 21 in the closing direction, the closed state is stably maintained.

(b) shows the opening and closing state in which the drawer 21 is opened by L1', the vessel 25 and the disposal box 22 placed on the vessel 25 move with a higher speed while approaching the door body 34, the movement amount thereof is three times the movement amount of the drawer 21 in the embodiment. Therefore, the movement amount of the vessel 25 is L3'=3×L1'. That is, the vessel 25 and the disposal box 22 placed on the vessel 25 move to the front side at a speed that is three times that at which the opening operation of the drawer 21 is performed.

The horizontal plane of the backing plate 42 is placed on the second support roller 40 such that a component force in the front-rear direction is not generated.

(c) shows the fully opened state in which the drawer 21 is opened by L1, the intermediate moving member 35 is positioned to be moved to the frontmost side, and the moving member 52 is positioned at the frontmost position close to the second toothed pulley 50. The vessel 25 on which the disposal box 22 is placed is positioned at the frontmost position at which the drawer 21 is opened by L3=3×L1, and is positioned in front of the front opening 20 such that the removal of the disposal box 22 and the attachment of the empty disposal box 22 can be easily performed. The second slope 94 of the backing plate 42 is placed on the second support rollers 40 and 40, and by applying a force to the drawer 21 in the opening direction, the opened state is stably maintained.

Immediately before the drawer reaches the fully opened state, the second slope 94 of the backing plate 42 is placed on the second support roller 40. Therefore, subsequently, a component force in the opening direction is generated, the drawer 21 moves in the opening direction due to the weight thereof and reaches the fully opened state.

Hereinabove, the opening operation has been described. When the closing operation of the drawer 21 is performe© (c), (b), and (a) are performed in this order, and the vessel 25 moves to the predetermined position in conjunction with the closing operation of the drawer 21.

Immediately before the drawer reaches the fully closed state, the first slope 93 of the backing plate 42 is placed on the second support roller 40. Therefore, subsequently, a so-called drawing operation is performed, in which a component force in the closing direction is generated, and the drawer 21 moves to the fully closed position due to the weight thereof. Therefore, the drawer is reliably closed to the fully closed position. The drawer 21 is prevented from being slightly opened immediately before the fully closed position, and the automatic analysis apparatus 1 that can reliably perform the closing operation can be provided.

Incidentally, along with the opening/closing operation of the drawer 21, the vessel 25 and the disposal box 22 are transported, for example, at a three times higher speed.

Therefore, when the drawer is rapidly stopped while moving to the fully opened or fully closed position, a large impact is generated. Thus, it is preferable to provide damping means for reducing the impact.

As an example of the damping means, a part of the drawer 21 or the vessel 25 abuts against a so-called hydraulic damper that generates damping according to a compressing operation such that a damping force is applied thereto for deceleration. However, assuming that the compression stroke of the hydraulic damper is, for example, about 20 mm, the drawer 21 or the vessel 25 is not decelerated until a position 20 mm before the fully opened position. Therefore, there is a problem in that the drawer 21 or the vessel 25 continuously accelerates according to a drawing force, collides with the hydraulic damper at a high speed, and thus is not sufficiently decelerated. Here, when the damping of the hydraulic damper is excessive, for example, a part of the drawer 21 abuts against the hydraulic damper, is compressed by 10 mm, and is stopped. Therefore, the impact is not sufficiently absorbed, and a large impact is generated. Conversely, in a case where the damping of the hydraulic damper is small, the drawer 21 or the vessel 25 is not sufficiently decelerated even when compressed by 20 mm, and is rapidly stopped at the fully opened position with a large impact.

Alternatively, as other decelerating means, a bush may be fitted to the rotational shaft, or a frictional load may be applied during the opening/closing operation using other friction braking means. However, as known by the Hooke's law, the frictional force is constant irrespective of the speed. Therefore, when a frictional load is applied, a force required for the opening/closing operation increases uniquely in a range from the fully opened position to the fully closed position by the constant frictional force. In a case where the frictional load is applied, when the operator applies the same force as that when there is no frictional load, the opening/closing speed can be reduced. However, when the operator additionally applies a force to open the drawer corresponding to the frictional force, the opening/closing speed is not reduced, and the drawer is accelerated until the fully opened position at the same speed as that when there is no frictional load, is rapidly stopped with a large impact.

As desired characteristics of the damping force in consideration of the above-described operation, resistance characteristics having speed dependence are desired, in which a low resistance force is generated when the opening/closing speed of the drawer 21 is low, and a higher resistance force is generated as the opening/closing speed of the drawer 21 increases. That is, when the operator applies a high force to the drawer 21 to open or close the drawer 21 at a high speed, it is preferable to increase the resistance force to increase the speed of the drawer 21 such that the opening/closing speed of the drawer 21 is reduced. The resistance characteristics having speed dependence are viscous resistance, and by applying the viscous resistance to the entire range of the opening/closing operation of the drawer 21, the opening/closing speed of the drawer 21 can be reduced, and an impact can be reduced when the drawer is fully opened or fully closed.

In the rotary damper 65, in general, for example, viscous fluid such as high-viscosity silicone oil is sealed, and a viscous resistance torque is generated by a shearing force of the viscous fluid generated between the outer circumference of the rotational shaft portion and the inner circumference of the fixed cylindrical case. In the rotary damper 65 having the above-described configuration, as the viscosity of the sealed viscous fluid increases, a higher viscous resistance torque is generated, but there is an upper limit on the speed of shear deformation. When shear deformation exceeding the upper limit speed is applied, the viscous fluid revolves separately on the inner circumferential side and the outer circumference side, and thus the viscous fluid rotates at a lower torque than a predetermined viscous resistance torque generated by shear deformation. That is, in the rotary damper 65, there is an upper limit on the usable rotational speed. Therefore, when the operator opens or closes the drawer 21 at a higher speed exceeding the upper limit of "the 'otational speed of the rotary damper 65, the rotary"damp'r 65 cannot generate a predetermined viscous resistance torque. As a result, the drawer 21 cannot be sufficiently decelerated due to an insufficient resistance force, the speed in the fully opened state or fully closed state increases, and the drawer is rapidly stopped at the time of impact.

In the embodiment, the fourth gear 64 meshing with the rack 58 rotates along with the opening/closing operation of the drawer 21, the fifth gear 66 that is larger than the fourth gear 64 rotates at a decelerated speed, and the shaft of the rotary damper 65 rotates. As a result, during the opening/closing operation, viscous damping can be applied. The rotary damper 65 rotates at a decelerated speed. Therefore, by appropriately selecting a reduction ratio between the fourth gear 64 and the fifth gear 66, viscous resistance depending on the opening/closing speed is generated without exceeding the upper limit of the rotational speed of the rotary damper 65 during the opening/closing operation. When the operator attempts to open or close the drawer 21 at a high speed, high viscous resistance is generated. As a result, the operator can be inhibited from operating the drawer 21 to open or close at a high speed, the opening/closing speed of the drawer 21 is reduced such that impact in the fully opened or fully closed state is reduced, and the automatic analysis apparatus 1 having high reliability can be provided.

In order to reduce the size of the automatic analysis apparatus 1, it is desirable to reduce the dimension in the front-rear direction of the housing 33. Therefore, the configuration in which the dimension in the front-rear direction of the housing 33 is reduced while securing the movement amounts of the drawer 21 and the vessel 25 will be described using FIGS. 18A and 18B. FIG. 18A shows a state where the drawer 21 is opened in a configuration in which the first toothed pulley 49 and the second toothed pulley 50 are provided in the housing 33. FIG. 18B is schematic side view showing a configuration according to the embodiment of the present invention in which the first toothed pulley 49 and the second toothed pulley 50 are provided in drawer the 21 with that moves along the opening/closing operation of the door body 34. When the drawer 21 is closed, the position of the vessel 25 is indicated by a chain line.

In the configuration in which the pair of toothed pulleys 49 and 50 wound around the toothed belt 51 are provided in the housing as shown in FIG. 18A, the interval in the front-rear direction at which the toothed pulleys 49 and 50 is maximum when the flange 68 for preventing the belt of the first toothed pulley 49 positioned on the rear side from being separated is provided close to the rear plate 32 of the housing 33 and the flange 68 of the second toothed pulley 50 positioned on the front side is provided close to the front opening 20. At this time, the interval between the first toothed pulley 49 and the second toothed pulley 50 is represented by L0.

The length of a linear portion of the toothed belt 51 wound around the pair of pulleys is equal to the inter-shaft distance between the pulleys, and the flange 68 having a large diameter for preventing the belt from being separated are provided in the first toothed pulley 49 and the second toothed pulley 50. Therefore, a moving distance L2 of the toothed belt 51 is within a range where the moving member 52 provided at one end of the toothed belt 51 does not interfere with the flanges 68 and 68 is less than the inter-shaft distance L0 between the first toothed pulley 49 and the second toothed pulley 50, and a relationship of L2<L0 is satisfied. The vessel 25 moves along with the outer circumference of the toothed belt 51. Therefore, the movement amount L3 of the vessel 25 is equal to the movement amount of the toothed belt and is L2, and a relationship of L3=L2 is satisfied.

When the drawer 21 is opened by L1 from the fully opened position, the second toothed pulley 50 is positioned in rear of the front opening 20, and the moving member 52 is positioned in rear of the second toothed pulley 50. On the other hand, when a vessel rear surface 69 of the vessel 25 on which the disposal box 22 is placed is positioned in front of the front opening 20 at the fully opened position, a so-called overhang configuration in which the drawer 21 protrudes to the front side from the moving member 52 to the vessel rear surface 69 by a distance L4 is established.

Here, when the drawer 21 is closed up to the fully closed position, the vessel 25 moves rearward by L2 along with the toothed belt 51. Therefore, at this time, the position is indicated by a chain line. The moving member 52 moves to a position immediately before the first toothed pulley 49, but the vessel 25 can retract only up to the front side position at the distance L4 from the moving member 52. Therefore, a distance L5 from the vessel 25 to the rear plate 32 is a so-called dead space that cannot be used.

When the vessel 25 retracts to the most retracted position, assuming that the disposal box 22 is positioned immediately below the reaction vessel disposal hole 12 of the blood analysis device 1, a space corresponding to the distance L5 is required for the rear side of the reaction vessel disposal hole 12, there is a limit in reducing the size of the blood analysis device 1, and there is a restriction on layout in that the reaction vessel disposal hole 12 cannot be provided in the vicinity of the rear plate 32.

The movement amount L2 of the vessel 25 cannot be made to be more than the interval L0 between the first toothed pulley 49 and the second toothed pulley 50. Therefore, by reducing the distance L5, the vessel rear surface 69 moves only to the front of the front opening 20 even when the drawer 21 is fully opened. Thus, there is a problem in that the disposal box 22 cannot be easily taken out.

In FIG. 18B, the pair of the first toothed pulley 49 and the second toothed pulley 50 wound around the toothed belt 51 are provided to be movable in the front-rear direction along with the drawer 21. When this configuration is compared to the configuration of FIG. 18A, the toothed belt 51 moves to the front side by the drawing-out amount L1 along with the first toothed pulley 49 and the second toothed pulley 50. Therefore, the vessel movement amount L3 is the sum of the moving distance L2 and the drawing-out amount L1 of the toothed belt 51, and a relationship of L3=L1+L2 is satisfied.

The second toothed pulley 50 provided on the front side is movable to the front of the front opening 20 along with the moving member 52. Accordingly, the overhang distance L4 between the moving member 52 and the vessel rear surface 69 can be reduced by the drawing-out amount L1. Here, L3>L2. Therefore, by increasing the movement amount L1 of the drawer 21, L3>L0, that is, the movement amount of the vessel 25 can also be made to be more than the distance between the first toothed pulley 49 and the second toothed pulley 50.

On the other hand, when the drawer 21 indicated by a chain line is closed, by arranging the position of the first toothed pulley 49 in the vicinity of a region immediately before the rear plate 32 as in the configuration of FIG. 18A, the moving member 52 can also move up to the same position as in the configuration of FIG. 18A. Therefore, the overhang distance L4 is reduced, and thus the vessel 25 can further move to the rear side. That is, the dead space of the distance L5 from the vessel 25 to the rear plate 32 can be reduced, which is suitable for reducing the size of the blood analysis device 1. In addition, the restriction on the arrangement layout of the reaction vessel disposal hole 12 can be reduced.

In other words, the distance L0 between the first toothed pulley 49 and the second toothed pulley 50 can be made to be less than the vessel movement amount L3. Therefore, by moving the rear plate 32 to the front side, the size of the housing 33 in the front-rear direction can be reduced, which is suitable for reducing the size of the blood analysis device 1.

Embodiment 2

Next, a second embodiment of the present invention will be described with reference to FIGS. 9 to 17B.

FIG. 9 is a perspective view of the disposal box drawing-out means, which shows a state of being drawn out. FIG. 10 is an exploded perspective view showing the disposal box drawing-out means, and FIG. 11 is a cross-sectional view taken along a line B-B showing the disposal box drawing-out means. FIG. 12A is a top view of the disposal box drawing-out means. FIG. 12B is a bottom view of the disposal box drawing-out means. FIG. 13 is a partial top view showing a configuration of deceleration means in the vicinity of the fully opened position, in which (a) shows a deceleration start state, (b) shows a deceleration state, and (c) shows a fully opened state. FIG. 14A is a graph showing a relationship between the drawing-out movement amount and the movement amount of the disposal box. FIG. 14B is a graph showing a relationship of a speed increasing ratio that is a ratio between the drawing-out movement amount and the movement amount of the disposal box. FIG. 15 is a side view showing a disposal box drawing operation, in which (a) shows a fully closed state, (b) shows an opening and closing state, and (c) shows a fully opened state. FIG. 16 is a top view showing a disposal box drawing operation, in which (a) shows a fully closed state, (b) shows an opening and closing state, and (c) shows a fully opened state. FIG. 17A is a schematic view showing a relationship between a swing arm and a second cam groove. FIG. 17B is a schematic view showing a relationship between swing arm and a first cam groove.

The second embodiment is different from the first embodiment, in that deceleration means 70 of the vessel 25 is provided in the vicinity of the fully opened position and the fully closed position instead of the rotary damper 65 provided, and the description of components having the same configurations as those of the first embodiment will not be repeated.

In addition, in the first embodiment, for example, when the drawer 21 moves by 250 mm, the speed of the vessel 25 uniquely increases by three times that of the drawer 21 such that the vessel 25 moves by 750 mm which is three times the movement amount of the drawer 21. In the second embodiment, there is a section in which the speed of the vessel 25 is decelerated by the deceleration means 70 to be lower than the three times speed. Therefore, in order to make the movement amount of the vessel 25 three times the movement amount of the drawer 21, the speed of the vessel 25 excluding the deceleration section is required to be higher than three times that of the drawer 21. In the second embodiment, for example, the speed of the vessel 25 is 3.2 times.

In the first embodiment, the moving pin 45 that is provided in the moving member 52 fixed to one side of the toothed belt 51 is fitted to the bottom surface of the vessel 25, and the vessel 25 moves in the front-rear direction together with the front-rear movement of the moving pin 45.

On the other hand, in the second embodiment, a swing arm 71 that is rotatable around the moving pin 45 is provided, a first cam plate 73 including a first cam groove 72 having a substantially U-shape is provided on a top surface of the intermediate moving member 35, a second cam plate 75 including a second cam groove 74 having a substantially U-shape is provided below the bottom surface of the vessel 25, the deceleration means 70 that decelerates the front-rear movement operation of the moving pin 45 through the first cam groove 72, the swing arm 71, and the second cam groove 74 and transmits the decelerated front-rear movement operation to the vessel 25 is provided in the vicinity of the fully opened position and in the vicinity of the fully closed position. Hereinafter, the details will be described.

As shown in FIG. 10 and appropriately FIGS. 12A, 12B, 13, 17A, and 17B, the first cam plate 73 that is upwardly convex is provided on the top surface of the intermediate moving member 35, and the first cam groove 72 is provided on a top surface of the first cam plate 73. The first cam groove 72 has a horizontally long substantially U-shape in a plan view when seen from the right. The length of the U-shape in the front-rear direction, that is, the width of the U-shape is provided to be longer than the sliding groove 54. In the vicinity of a front end and a rear end of the first cam groove 72, a substant¼ly ¼ arc-shaped portion that is front-rear symmetrical is curved such that a tip thereof approaches the left side. On the further tip, a pair of curved portions 77 and 77 including first linear portions 76 and 76 that face the left side are provided, and a second linear portion 79 that extends along the sliding groove in the front-rear direction and connects the pair of curved portions 77 and 77 is provided. A substantially U-shape that is symmetric in the front-rear direction is formed as a whole.

On the right side of the second linear portion 79 of the first cam groove 72 that faces the U-shaped outer side, a pair of notch portions 78 and 78 in which the first cam plate 73 that is symmetric in the front-rear direction is partially notched are provided. In the notch portions 78 and 78, the first cam groove 72 forms the same surface as the top surface of the intermediate moving member 35. In other words, in the notch portions 78 and 78, the first cam groove 72 is open to the outside.

The second cam plate 75 that is downwardly convex is provided on a lower surface of the vessel 25, and the second cam groove 74 facing the first cam groove 72 is provided on a lower surface of the second cam plate 75. The second cam groove 74 has a substantially U-shape in a plan view when seen from the right, the length (U-shape width) of the U-shape in the front-rear direction is provided in a range of the length of the vessel 25 in the front-rear direction, and the U-shape width of the second cam groove 74 in the front-rear direction is less than the U-shape width of the first cam groove 72.

A range of the second cam groove 74 on the left side of the sliding groove 54 forms third linear portions 80 and 80 that are front-rear symmetrical, is perpendicular to the opening/closing direction of the drawer 21, and has a linear shape facing the left side. A range of the second cam groove 74 on the right side of the sliding groove 54 is a center curved portion 81 that smoothly connects the third linear portions 80 and 80 of the U-shaped groove, and the groove width of the center curved portion 81 in the left-right direction is more than that of the third linear portions 80 and 80 of the U-shaped groove. The details of the shape will be described below.

The swing arm 71 is axially supported to be rotatable within a horizontal plane around the rotational shaft as the moving pin 45 that is movable along the sliding groove 54 in the front-rear direction, and is provided above the first cam plate 73 and below the second cam plate 75, that is, between the first cam plate 73 and the second cam plate 75.

A swing center 82 that is a hole penetrating the moving pin 45 is provided in the swing arm 71, and the swing arm 71 is axially supported to be rotatable around the moving pin 45 within a horizontal plane.

At one end of the swing arm 71, a first guide roller 83 that is convex on a top surface side of the swing arm 71 is axially supported to be rotatable around a shaft in the up-down direction, and a second guide roller 84 that is convex on a lower surface side of the swing arm 71 swinging around the same axis as that of the first guide roller 83 is axially supported to be rotatable around the shaft in the up-down direction.

At another end of the swing arm 71 on the opposite side with respect to the swing center 82, a third guide roller 85 that is convex on the top surface side of the swing arm 71 is axially supported to be rotatable around the rotational shaft extending in the up-down direction, and a fourth guide roller 86 that is convex on the lower surface side of the swing arm 71 swinging around the same axis as that of the third guide roller 85 is axially supported to be rotatable around the rotational shaft extending in the up-down direction.

In the embodiment, the first guide roller 83 and the third guide roller 85 are positioned at positions symmetrical to each other with respect to the swing center 82, and the second guide roller 84 and the fourth guide roller 86 are positioned at positions symmetrical to each other with respect to the swing center 82. In addition, all the diameters of the first guide roller 83, the second guide roller 84, the third guide roller 85, and the fourth guide roller 86 are the same.

The widths of the curved portions 77 and 77 and the first linear portions 76 and 76 of the first cam groove 72 are substantially equal to the diameters of the second guide roller 84 and the fourth guide roller 86, and have a dimension in which the second guide roller 84 and the fourth guide roller 86 are smoothly slidable in the first cam groove 72 with an appropriate gap. When the moving pin 45 provided in the moving member 52 moves in the front-rear direction along the sliding groove 54, the swing arm 71 moves in the front-rear direction together with the moving pin 45, and the second guide roller 84 and the fourth guide roller 86 move along the first cam groove 72 provided in the first cam plate 73.

The width of the third linear portion 80 of the linear U-shaped groove facing the left on the left side of the second cam groove 74 further than the sliding groove 54 is substantially equal to the diameters of the first guide roller 83 and the third guide roller 85, and has a dimension in which the first guide roller 83 and the third guide roller 85 are smoothly slidable in the third linear portion 80 with an appropriate gap. The first guide roller 83 and the third guide roller 85 move along the second cam groove 74 provided in the second cam plate 75.

FIGS. 12A and 12B show the opening and closing state of the drawer 21, the moving pin 45 is positioned substantially at the center of the sliding groove 54, and the second guide roller 84 and the fourth guide roller 86 provided in the swing arm 71 are in contact with the second linear portion 79 of the first cam groove 72. A direction of a line obtained by connecting the second guide roller 84 and the fourth guide roller 86 will be referred to as "direction of the swing arm 71", and the swing arm 71 faces the front-rear direction.

Even when the drawer 21 moves in the front-rear direction such that the moving pin 45 moves along the sliding groove 54 in the front-rear direction, a state where the second guide roller 84 and the fourth guide roller 86 are in contact with the second linear portion 79 of the first cam groove 72 is maintained. Therefore, the second guide roller 84 and the fourth guide roller 86 move along the sliding groove 54 together with the moving pin 45 in the front-rear direction without a change in the direction of the swing arm 71.

The first guide roller 83 and the third guide roller 85 are arranged on the same shafts as those of the second guide roller 84 and the fourth guide roller 86, and are positioned at a boundary between the third linear portions 80 and 80 at opposite ends of the U-shaped groove of the second cam groove 74 and the center curved portion 81. Accordingly, the first guide roller 83 and the third guide roller 85 move in the front-rear direction. Therefore, the second cam plate 75 and the vessel 25 move together with the moving pin 45 in the front-rear direction through the U-shaped groove of the second cam groove 74.

An operation of decelerating the vessel 25 relative to the door body 34 in the vicinity of the fully opened position when the drawer 21 is opened will be described using FIG. 13. FIG. 13 is a partial top view of the disposal box drawing-out means 24.

(a) of FIG. 13 shows a state in which the drawer 21 is positioned in front of the fully opened position, the second guide roller 84 and the fourth guide roller 86 are in contact with the second linear portion 79 of the first cam groove 72, and the swing arm 71 faces the front-rear direction. During the opening operation, the second guide roller 84 moves to the front side in advance, and the position shown in (a) of FIG. 13 is a boundary position between the second linear portion 79 and the curved portion 77. In the embodiment, for example, the moving pin 45 moves by a moving amount 3.2 times the movement amount of the drawer 21. Therefore, the vessel 25 moves to the front side at an increased speed that is 3.2 times that of the opening operation of the drawer 21.

(b) of FIG. 13 shows a state where the drawer 21 is moved from the position of (a) of FIG. 13 by Z1 in the opening direction. The movement amount X1 of the moving pin 45 is 3.2 times of the movement amount Z1 of the drawer 21, and X1=3.2×Z1. That is, the moving pin 45 moves at a speed that is 3.2 times that of the drawer 21.

At this time, the second guide roller 84 moves from the second linear portion 79 of the first cam groove 72 to the curved portion 77 thereof. Therefore, the swing arm 71 swings by an angle θ1 from the front-rear direction.

The first guide roller 83 is positioned at a position concentric with the second guide roller 84. Therefore, the first guide roller 83 moves toward the tip side of the U-shaped third linear portion 80 of the second cam groove 74. Accordingly, the distance in the front-rear direction between the first guide roller 83 and the moving pin 45 decreases by a value multiplied by cosθ1 due to the swinging of the swing arm 71 by the angle θ1. Accordingly, when the movement amount of the vessel 25 is represented by Y1, Y1<X1. That is, the movement further to the front side moving speed of the vessel 25 is lower than that of the drawer 21 by 3.2 times, and the vessel 25 is decelerated.

(c) of FIG. 13 shows a fully opened state where the drawer 21 is further moved from the position of (b) of FIG. 13 by Z2 in the opening direction. The moving pin 45 abuts against the front end of the sliding groove 54 to function as a stopper. Therefore, the movement further to the front side of the drawer 21 and the vessel 25 from the fully opened position is stopped. In (c) of FIG. 13, the moving pin 45 moves by a moving amount 3.2 times the movement amount of the drawer 21. Therefore, the movement amount X2 of the moving pin 45 is 3.2 times the movement amount Z2 of the drawer 21, and X2=3.2×22. The second guide roller 84 moves to the first linear portion 76 in the vicinity of the tip of the curved portion 77 of the first cam groove 72. Therefore, in the vicinity of the fully opened position, the second guide roller 84 does not move in the front-rear direction relative to the drawer 21, and the swing arm 71 swings by an angle θ2 from the front-rear direction. The first guide roller 83 further moves along the tip side of the third linear portion 80 of the U-shaped tip of the second cam groove 74, and the distance in the front-rear direction between the first guide roller 83 and the moving pin 45 decreases by a value multiplied by cosθ2 due to the swinging of the swing arm 71. When the movement amount of the vessel 25 is represented by Y2, Y2<X2. Assuming that θ2 is, for example, about 70°, cos70°≅0.34. The movement amount of the vessel 25 is reduced by about ⅓ relative to the movement amount of the moving pin 45, and the moving pin 45 and the vessel 25 have the same speed.

That is, the first guide roller 83 in the vicinity of the fully opened position is the third linear portion 80 of the U-shaped tip of the second cam groove 74, and assuming that the second guide roller 84 is positioned at the first linear portion 76 that faces the left in the vicinity of the tip of the curved portion of the first cam groove 72, the movement amount of the first cam groove 72 to the front side is equal to the movement amount of the second cam groove 74 to the front side. Therefore, the drawer 21 and the vessel 25 move to the front side at the same speed and reach the fully opened position.

That is, as shown in (a) of FIG. 13, when the swing arm 71 moves along the second linear portion 79 of the first cam groove 72 in the front-rear direction, the vessel 25 is driven at an increased speed that is 3.2 times that of the drawer 21. However, by swinging the swing arm 71 in the fully opened state or immediately before the fully opened state as shown in (c) of FIG. 13, the vessel 25 is decelerated to the same speed as that of the drawer 21. That is, the moving distance Z3 of the drawer 21 from the position shown in (a) of FIG. 13 to the position shown in (c) of FIG. 13 satisfies Z3=Z1+Z2. At this time, the movement amount Y3 of the vessel 25 or the disposal box 22 satisfies Y3=Y1+Y2. In the range of Y3 or Z3, the vessel 25 is decelerated. In the embodiment, Z3 is, for example, about 30 mm to 40 mm.

In other words, when the opening operation of the drawer 21 is performed, the vessel 25 is driven at an increased speed that is 3.2 times that of the drawer 21, is decelerated to the same speed as that of the drawer 21, and is stopped at the fully opened position.

When the drawer 21 moves to the rear side from the fully opened position and starts the closing opera©n, (c), (b), and (a) of FIG. 13 are performed in this order. As a result, the vessel 25 is driven at the same speed as that of the drawer 21, is driven at an increased speed that is 3.2 times that of the drawer 21, and moves to the rear side at the same speed that is 3.2 times that of the drawer 21.

Hereinabove, the operation in the vicinity of the fully opened position of the drawer 21 has been described. The actions in the vicinity of the fully closed position of the drawer 21 are mirror images symmetric to those of FIG. 13 in the front-rear direction (the left-right direction in the drawing) except for the door body 34. The operations in which the drawer reaches the fully closed position during the closing operation are performed in order of the mirror images of (a), (b), and (c) of FIG. 13, and the mirror image of (c) of FIG. 13 shows the fully closed state. Along with the closing operation of the drawer 21, the vessel 25 is driven at an increased speed that is 3.2 times that of the drawer 21, is decelerated to the same speed as that of the drawer 21, and is fully stopped at the fully closed position.

When the drawer starts to open from the fully closed state, as shown in the mirror i©es of (c), (b), and (a) of FIG. 13, the opening operation of the vessel 25 is performed while being accelerated from the same speed as that of the drawer 21 to the speed that is 3.2 times that of the drawer 21.

In the embodiment, the configuration in which the first cam groove 72 and the second cam groove 74 have a U-shape when seen from the right side has been described. However, the present invention is not limited to this configuration. A configuration in which the first cam groove 72 and the second cam groove 74 have a U-shape as a left-right symmetrical shape when seen from the left side may be adopted.

When the door body 34 is drawn to the front side from the fully closed position of the drawer 21 and the drawer 21 moves up to the fully opened position, displacement characteristics and speed characteristics of the vessel 25 will be described using FIGS. 14A and 14B.

FIG. 14A is a graph showing a relationship between the movement amount of the drawer 21 and the movement amount of the disposal box 22 or the vessel 25. FIG. 14B is a graph showing a relationship of a speed increasing ratio that is a ratio between the movement amount of the drawer 21 and the movement amount of the disposal box 22 or the vessel 25. The horizontal axis represents the movement amount of the drawer 21, the left end represents the fully closed position, and the right end represents the fully opened position.

In the embodiment, for example, when the drawer 21 is drawn from the fully closed position to the fully opened position by 250 mm, the vessel 25 or the disposal box 22 placed on the vessel 25 moves to the front side by 750 mm.

In FIG. 14A, the horizontal axis represents the movement amount or the opening amount of the drawer 21, which is 0 mm at the fully closed position and is 250 mm at the fully opened position. The vertical axis represents the movement amount of the vessel 25 or the disposal box 22, which is 0 mm at the fully closed position and is 750 mm at the fully opened position.

As described above using FIG. 13, in ranges of Z3 in the vicinity of the fully opened position and in the vicinity of the fully closed position, the vessel 25 is accelerated or decelerated in a range of the same speed as that of the drawer 21 and the speed that is 3.2 times that of the drawer 21. Other ranges are constant-speed sections in which the movement amount of the vessel 25 is a constant value that is 3.2 times the movement amount of the drawer 21. Therefore, the graph is linear, and when the drawer 21 moves at the constant speed, the vessel moves in the same direction as that of the drawer 21 at the constant speed that is 3.2 times that of the drawer 21.

On the other hand, in the range of Z3 in the vicinity of the fully closed position, the graph has a curved shape that is downwardly convex. In the range of Z3 in the vicinity of the fully opened position, the graph has a curved shape that is upwardly convex.

In FIG. 14B, the vertical axis represents a ratio of the speed of the vessel 25 or the disposal box 22 to the speed of the drawer 21, that is, a speed increasing ratio. In the embodiment, for example, when the drawer 21 is drawn by 250 mm, the vessel 25 or the disposal box 22 placed on the vessel 25 moves to the front side by 750 mm. Therefore, the average speed increasing ratio is 3. However, the speed increasing ratios in the vicinity of the fully closed position and in the vicinity of the fully opened position are lower than the average speed increasing ratio. Therefore, the speed increasing ratio in the constant-speed range is higher than 3. In the embodiment, the speed increasing ratio in the constant-speed range is, for example, 3.2.

On the other hand, when the drawer starts the opening operation from the fully closed position, the drawer is in the front-rear symmetrical state (left-right symmetrical in the ©wing) of (c) of FIG. 13, and the speed of the drawer 21 and the speed of the vessel 25 are the same. Therefore, the speed increasing ratio is 1. As the drawer 21 approaches the fully opened state, the speed increasing ratio increases. At a position at which the drawer 21 is opened by Z3, the state is front-rear symmetrical (left-right symmetrical) to (a) of FIG. 13, and the speed increasing ratio is 3.2. Subsequently, the vessel 25 moves at the constant speed increasing ratio.

In the range of 23 in the vicinity of the fully opened position from (a) to (c) of FIG. 13, the speed increasing ratio of the vessel 25 is reduced from 3.2, and the speed of the drawer 21 and the speed of the vessel 25 are the same at the fully opened position. Therefore, the speed increasing ratio is 1.

That is, as shown in FIG. 14B, the speed increasing ratio of the vessel 25 to the drawer 21 is 1 at the fully closed position and the fully opened position, is increased or reduced in the ranges of Z3, and is constant at 3.2 in the constant-speed range other than the ranges of Z3. When the drawer 21 is opened from the fully closed position to the fully opened position at the constant speed, the opening operation of the vessel 25 is performed at the speed increasing ratio shown in FIG. 14B according to the speed characteristics.

Needless to say, during the closing operation of the drawer 21, in the embodiment, the characteristic of the speed increasing ratio in the vicinity of the fully opened position are symmetrical to those in the vicinity of the fully closed position. Therefore, the closing operation of the vessel 25 having the same speed characteristics as that of the opening operation is reversibly performed in a direction opposite to that of the opening operation.

A relationship between the operation of the drawer 21 from the fully closed position to the fully opened position and the movement amount of the vessel 25 will be described using FIGS. 15 and 16. FIG. 15 is side view of the disposal box drawing-out means. FIG. 16 is a top view showing the disposal box drawing-out means, in which (a) shows a fully closed state, (b) shows an opening and closing state, and (c) shows a fully opened state. In (a) of FIG. 15 and (a) of FIG. 16, the drawer 21 is positioned at the fully closed position, and the vessel 25 and the disposal box 22 are positioned at predetermined positions immediately below the reaction vessel disposal hole 12.

When the door body 34 of the drawer 21 is opened by L1', the vessel starts the opening operation at the same speed as that of the drawer 21 according to the displacement characteristics shown in FIG. 14A or the speed increasing ratio characteristics shown in FIG. 14B, is accelerated, is moved by L3' in the same direction as that of the drawer 21, and reaches the opening and closing state shown in (b) of FIG. 15 or (b) of FIG. 16.

Further, when the drawer is opened to L1, the drawer reaches the fully opened state, and the vessel 25 moves to the front side at an increased speed, is decelerated to the same speed as that of the drawer 21, is moved by L3, and reaches the fully opened pos©on shown in (©of FIG. 15 and (c) of FIG. 16.

Hereinabove, the opening operation from the fully closed state to the fully opened state has been described. However, assuming that the drawer 21 moves to the rear side from the fully o©ed state sho©in (c) of FIG. 15 or (c) of FIG. 16, the drawer 21 reaches the fully closed position shown in (a) of FIG. 15 or (a) of FIG. 16 through the opening and closing state shown in (b) of FIG. 15 or (b) of FIG. 16. That is, the drawer 21 is reversibly movable in both the opening and closing directions.

The shape of the first cam groove 72 and the second cam groove 74 will be described using FIGS. 17A and 17B. FIG. 17A is a schematic view showing a relationship between the swing arm 71 and the first cam groove 72, and FIG. 17B is a schematic view showing a relationship between the swing arm 71 and the second cam groove 74. In FIGS. 17A and 17B, an outline of the swing arm 71 is not shown except for a partial image, and outlines of the moving pin 45 at the rotational center of the swing arm 71, the first guide roller 83 and the third guide roller 85 provided at one end of the swing arm 71, the second guide roller 84 provided at another end of the swing arm 71, and the fourth guide roller 86 and a virtual line obtained by connecting one end and another end of the swing arm 71 are schematically shown. In addition, positions corresponding to the movements of the moving pin 45, the first guide roller 83, the second guide roller 84, the third guide roller 85, and the fourth guide roller 86 are represented by reference numerals a to f.

As described above using FIG. 13, the swing arm 71 rotates around the moving pin 45 as the rotational center, the second guide roller 84 provided at one end and the fourth guide roller 86 provided at another end move along the first cam groove 72, and the first guide roller 83 provided at one end and the third guide roller 85 provided at another end with respect to the swing arm 71 move along the second cam groove 74.

In FIG. 17A, at the position represented by reference numeral a, as shown in (a) of FIG. 13, a second guide roller 84a and a fourth guide roller 86a are in contact with the second linear portion 79 of the first cam groove 72, and the swing arm 71 faces the front-rear direction.

The movement amount X3 of the vessel 25 from this position to the fully opened position is the difference between the movement amount (X1+X2) of the moving pin 45 and the movement amount (Z1+22) of the drawer 21 as shown in FIG. 13. Therefore, X3=(X1+X2)−(Z1+Z2).

When the drawer 21 moves to the front side, along with the movement of a moving pin 45b to the front side, a second guide roller 84b penetrates into the curved portion 77 of the first cam groove 72 and moves slightly to the left (upward in the drawing), the swing arm 71 rotates around the moving pin 45b, and the fourth guide roller 86b moves to the right of the second linear portion 79. Further, when the moving pin 45 mo43ositionto the fully opened position of 45f through 45c, 45d, and 45e, the second guide roller 84 moves up to 84f along the curved portion 77 through 84c, 84d, and 84e. On the other hand, the fourth guide roller 86 moves away to the right from the second linear portion 79 up to 86f through 86c, 86d, and 86e and traces a roller trajectory 87 up to the fully opened position of the drawer 21, and the swing arm 71 is inclined by the angle θ2 with respect to the front-rear direction. Accordingly, in order not to interfere with the movement of the fourth guide roller 86 along the roller trajectory 87 and the rotation of the swing arm 71, it is preferable that the notch portion 78 in which the cam groove is notched is provided on a side of the second linear portion 79 of the first cam groove 72 opposite to a curve direction of the curved portion 77. Alternatively, the notch portions 78 and 78 are continuously formed to be integrated in the front-rear direction.

Further, since the first cam groove 72 has a substantially U-shape that is symmetrical in the front-rear direction, it is desirable that a pair of notch portions 78 that are symmetrical in the front-rear direction are provided.

In FIG. 17B, at the position represented by reference numeral a, as shown in (a) of FIG. 13, a first guide roller 83a and a third guide roller 85a are in contact with boundary portions between the third linear portions 80 and 80 of the second cam groove 74 and the center curved portion 81, and the swing arm 71 faces the front-rear direction.

The movement amount X4 of the vessel 25 from this position to the fully opened position is the difference between the movement amount (X1+X2) of the moving pin 45 and the movement amount (Y1+Y2) of the drawer 25 as shown in FIG. 13.—Therefore, X4=(X1+X2)−(Y1+Y2).

Hereinafter, as in FIG. 17A, the position corresponding to reference numeral b is not shown, and reference numerals c to f are used for the description. When the drawer 21 moves to the front side, along with the movement of a moving pin 45c to the front side, a first guide roller 83c penetrates into the third linear portion 80 provided on the front in the second cam groove 74 having a U-shape and moves to the left (upward in the drawing), and a third guide roller 85c moves to the right front side (lower left side in the drawing). Further, when the moving pin 45 moves up to the fully opened position of 45f through 45d and 45e, the first guide roller 83 moves to the left (upward in the drawing) up to 83f along the third linear portion 80 through 83d and 83e, the third guide rollers 85d, 85e, and 85f moves in the center curved portion 81 along the roller trajectory 88, and the swing arm 71 is inclined by the angle θ2 with respect to the front-rear direction. Here, a driving force to the front of the moving pin 45 is transmitted from the first guide roller 83 to the vessel 25 through the second cam groove 74. Therefore, it is desirable that the third guide roller 85 provided on the rear side has a shape not to be in contact with the second cam groove 74 and that the center curved portion 81 has a wide shape having a margin around the roller trajectory 88.

In addition, when the closing operation of the drawer 21 is performed, the third guide roller 85 provided at the rear end on the rear side of the swing arm 71 moves to the left along a third linear portion 80', and then the first guide roller 83 moves in the center curved portion 81 along a roller trajectory 88'. Therefore, it is preferable that the second cam groove 74 has a shape that is symmetrical in the front-rear direction (the left-right direction in the drawing).

In the second embodiment, when the opening operation of the drawer 21 is performed, the vessel 25 that moves at an increased speed is decelerated in the vicinity of the fully opened position and then reaches the fully opened state. When the closing operation of the drawer 21 is performed, the vessel 25 that moves at an increased speed is decelerated in the vicinity of the fully closed position and then reaches the fully closed state. In the intermediate section excluding the vicinity of the fully opened or fully closed position, the vessel 25 moves at a constant speed that is higher than that of the drawer 21. Therefore, impact applied to the vessel in the fully opened or fully closed state can be reduced.

In the second embodiment, the case where the first cam groove 72 and the second cam groove 74 have a substantially U-shape that is symmetrical in the front-rear direction and the degree of deceleration for the fully opened state is the same as that for the fully closed state has been described. However, the shape is not limited to being symmetrical, and a configuration in which the first cam groove 72 and the second cam groove 74 have a U-shape that is asymmetrical in the front-rear direction and the degree of deceleration for the fully opened state is different from that for the fully closed state may be adopted.

For example, when the opening operation of the drawer 21 is performed, the disposed sample dispensing tips/reaction vessels are accumulated in the disposal box 22. Therefore, it is desirable that the degree of deceleration for the fully opened state is high such that impact is reduced and the sample dispensing tip/reaction vessel is prevented from being scattered. On the other hand, when the closing operation of the drawer 21 is performed, the empty disposal box 22 is supplied. Therefore, even when impact in the fully closed state is large, there is no problem.

Embodiment 3

Next, a third embodiment of the present invention will be described with reference to FIGS. 19 and 20.

FIG. 19 is an exploded perspective view of the disposal box drawing-out means 24 according to the third embodiment. FIG. 20 is a side view showing a disposal box drawing operation, in which (a) shows a fully closed state, (b) shows an opening and closing state, and (c) shows a fully opened state.

The third embodiment is different from the first embodiment, in that the rotary damper 65 is not provided, the driving mechanism 36 does not move the vessel 25 in the front-rear direction in conjunction with the opening/closing operation of the drawer 21, and an electric driving mechanism 36' electrically moves the vessel 25 relative to the intermediate moving member 35 in the front-rear direction is provided. The description of components having the same configurations as those of the first embodiment or the second embodiment will not be repeated.

In the vicinity of the rear end of the intermediate moving member 35, for example, a stepping motor 90 as a driving source in which a motor shaft that rotates around the vertically provided rotational shaft hole 89 faces downward, a pinion gear 91 that rotates together with the motor shaft, and a sixth gear 92 that meshes with the pinion gear 91, rotates together with the first toothed pulley 49, and has a number of teeth more than that of the pinion gear 91 are provided.

That is, when a current is applied to the stepping motor 90 to rotate the motor shaft, through the pinion gear 91 and the sixth gear 92, the first toothed pulley 49 rotates at a reduced speed, the moving member 52 provided in the toothed belt 51 moves in the front-rear direction along with one side of the toothed belt 51, the moving pin 45 provided in the moving member 52 moves in the front-rear direction along the sliding groove 54, and the vessel 25 moves in the front-rear direction together with the moving pin 45.

The drawing operation of the disposal box 22 or the vessel 25 according to the third embodiment will be described using FIG. 20. In the fully closed state of (a) of FIG. 20, the drawer 21 is closed, and the vessel 25 is positioned at a position in the vicinity of the rear end of the intermediate moving member 35 and close to the stepping motor 90. The disposal box 22 is positioned at a predetermined position immediately below the sample dispensing tip/reaction vessel disposal hole 12.

First, for example, when the operator operates a "disposal box takeout" operation button (not shown), for example, a driving signal is generated from a microcomputer 200 such that the stepping motor 90 rotates in the opening direction.

When the stepping motor 90 rotates in the opening direction, the toothed belt 51 is driven through the pinion gear 91, the sixth gear 92, and the first toothed pulley 49, the moving member 52 provided on one side of the toothed belt 51 moves to the front side, and the moving pin 45 moves to the front side along the sliding groove 54 of the intermediate moving member 35.

When the stepping motor 90 is driven by a predetermined number of pulses and then stopped, the moving pin 45 is moved to the front side by L2, is moved up to the front end portion of the sliding groove 54, and is stopped. Here, L2 represents the feed amount of the outer circumference of the toothed belt 51, for example, 500 mm. The vessel 25 and the disposal box 22 are positioned at a vessel takeout ready position shown in (b) of FIG. 20 close to the rear side of the door body 34. When the interlock (not shown) is released in this state, the operator can operate the drawer 21.

Next, when the operator draws the door body 34 of the drawer 21 to the fro©side by L1, as shown in (c) of FIG. 20, the vessel 25 or the disposal box 22 positioned at the vessel takeout ready position in the vicinity of the rear side of the door body 34 is also drawn to the front side. L1 is, for example, about 250 mm, the disposal box 22 is drawn to the front further than the front opening 20 to be positioned at the takeout position, and the takeout of the disposal box 22 from the vessel 25 or the setting of the empty disposal box 22 on the vessel 25 can be easily performed.

(b) of FIG. 20 shows a state where the drawer 21 is closed after setting the empty disposal box 22 to the vessel 25. When the operator operates a "disposal box setting" operation button (not shown) in this state, the interlock (not shown) functions such that the stepping motor 90 rotates in the closing direction by a predetermined number of pulses and then stopped. In this case, the moving pin 45 moves to the rear side by L2, and the vessel 25 moves from the takeout ready position to the predetermined position.

In the embodiment, the configuration in which the stepping motor 90 is used as the driving source has been described. However, the driving source is not limited to the stepping motor 90 and may be a so-called servo motor or a direct current motor. Further, a configuration in which, for example, a micro switch or a photoelectric switch for detecting the fully opened position and the fully closed position of the vessel 25 is provided such that the completion of the movement operation of the vessel 25 is detected and notified to the microcomputer 200 may be adopted.

In the third embodiment, during the opening/closing operation of the drawer 21, the vessel 25 is not driven at an increased speed. Therefore, when the opening/closing operation of the drawer 21 is performed, a force to increase the speed of the vessel 25 is not required, and the drawer 21 can be opened and closed with a lower force. Therefore, an automatic analysis apparatus having high handling properties can be provided.

Further, by gradually decelerating the motor in the vicinity of the fully opened position and the fully closed position and then stopping the motor, impact can be reduced, and an automatic analysis apparatus having high reliability can be provided.

In the present invention, the first toothed pulley 49, the second toothed pulley 50, and the toothed belt 51 are provided in the intermediate moving member 35 that is opened or closed in the front-rear direction together with the drawer 21. Therefore, the movement amount of the vessel 25, that is, the distance between the predetermined position and the takeout position is equal to the movement amount of moving member 52 provided in the toothed belt 51, which is the sum of the movement amount of the drawer 21 and the movement amount of the outer circumference of the toothed belt 51 provided in the drawer 21. Therefore, the movement amount of the vessel 25 can be increased.

Further, the rotational shaft of the first toothed pulley 49 is arranged in the vicinity of the rear side of the intermediate moving member, and the second toothed pulley 50 is provided in the vicinity of the front end of the intermediate moving member 35 to be close to the door body 34. Therefore, the interval between the first toothed pulley 49 and the second toothed pulley 50 increases, the moving distance of the moving member 52 by the toothed belt 51 further increases, and the moving distance in the front-rear direction of the vessel 25 or the disposal box 22 placed on the vessel 25 can increase.

In the present invention, the first rails 41 and 41, the second rails 43 and 43, the third rail 57, the toothed belt 51, and the like that extend in the front-rear direction and support the drawer 21, the vessel 25, and the moving member 52 to be movable in the front-rear direction are placed side by side in the left-right direction without overlapping each other in the up-down direction. Therefore, the driving portion can be made thin, the size in the height direction can be reduced, and the driving mechanism 36 can be made thin.

In the present invention, by providing a reinforcement member 38 that maintains a positional relationship in which the intermediate moving member 35 and the door body 34 are perpendicular to each other to improve fixing rigidity between the intermediate moving member 35 and the door body 34, the inclination deformation of the door body 34 in the front-rear direction is inhibited when the opening/closing operation of the drawer 21 is performed, and the automatic analysis apparatus in which the opening/closing operation of the drawer 21 is stable can be provided.

In the first embodiment, irrespective of whether the drawer 21 moves to the front side or to the rear side, the rotary damper 65 rotates at a reduced speed to generate viscous resistance having speed dependence. Therefore, viscous resistance depending on the opening/closing speed is generated without exceeding the upper limit of the rotational speed of the rotary damper 65 during the opening/closing operation of the drawer 21. When the operator attempts to open or close the drawer 21 at a high speed, a resistance force increases. As a result, the operator can be inhibited from operating the drawer 21 to open or close at a high speed, the opening/closing speed of the drawer 21 is restricted such that impact in the fully opened or fully closed state is reduced, and the automatic analysis apparatus 1 having high reliability can be provided.

In the present invention, the slopes 93 and 94 are provided at the front end and the rear end of the backing plate 42, respectively, and the first support roller 39 is arranged to be positioned on the slope 93 or 94 when the drawer 21 is fully opened or fully closed. Therefore, a force to fully open the drawer 21 or a force to fully close the drawer 21 is generated by the weight of the drawer 21 and a component force generated from the slope without adding a special component. As a result, the drawer 21 is stable in the front-rear direction.

The present invention is not limited to the embodiment and includes various modification examples. For example, the embodiments have been described in detail in order to easily describe the present invention, and the present invention is not necessarily to include all the configurations described above. In addition, a part of the configuration of one embodiment can be replaced with the configuration of another embodiment. Further, the configuration of one embodiment can be added to the configuration of another embodiment. In addition, addition, deletion, and replacement of another configuration can be made for a part of the configuration each of the embodiments.

REFERENCE SIGNS LIST

1: automatic analysis apparatus
2: reagent disk
3: reagent bottle
4: safety cover
5: sample transport means
6: sample dispensing means
7: tip rack (sample dispensing tip/reaction vessel supply means)
8: sample dispensing tip/reaction vessel transport means
9: incubator
10: sample dispensing tip
11: sample dispensing tip buffer
12: sample dispensing tip/reaction vessel disposal hole
13: reaction liquid stirring means
14: reaction vessel
15: reagent dispensing pipette
15a: reagent dispensing position
16: stirring means
16a: reagent stirring position
17: washing means
18: reaction liquid suction nozzle
19: detecting means
20: front opening
21: drawer
22: disposal box
23: reagent bottle loading port
24: disposal box drawing-out means
25: disposal box mounting table (vessel)
26: top opening
27: top plate
28: front plate
29: right side plate
30: left side plate
31: bottom plate
32: rear plate
33: housing
34: door body
35: intermediate moving member
36: driving mechanism (disposal box moving means)
37: handle
38: reinforcement member
39: first support roller
40: second support roller
41: first rail
42: backing plate
43: second rail
44: third support roller
45: moving pin
46: moving pin receiving hole
47: rotational shaft A
48: rotational shaft B
49: first toothed pulley
50: second toothed pulley
51: toothed belt
52: moving member
53: belt fixing member
54: sliding groove
55: fourth support roller
56: tension roller
57: third rail
58: rack
59: rotational shaft C
60: first gear
61: second gear
62: third gear
63: rotational shaft D
64: fourth gear
65: rotary damper
66: fifth gear
67: rotary damper fixture hole
68: flange
69: vessel rear surface
70: deceleration means
71: swing arm
72: first cam groove
73: first cam plate
74: second cam groove
75: second cam plate
76: first linear portion
77: curved portion
78: notch portion
79: second linear portion
80: third linear portion
81: center curved portion
82: swing center
83: first guide roller
84: second guide roller
85: third guide roller
86: fourth guide roller
87: roller trajectory
88: roller trajectory
89: rotational shaft hole
90: stepping motor
91: pinion gear
92: sixth gear
93: first slope
94: second slope
200: host computer

The invention claimed is:

1. An automatic analysis apparatus, comprising:
a housing which accommodates an analysis device;
a vessel disposed at a predetermined position in the housing;
an opening for taking the vessel into/from the housing, which is provided in the housing;
an intermediate moving member which is operated to take the vessel into/from the housing via the opening;
a transport mechanism which includes the intermediate moving member and which transports the vessel from the predetermined position to a vessel takeout position along with the operation of the intermediate moving member; and a plurality of gears which reduces an operation amount of the intermediate moving member as compared with a movement amount of the vessel from the predetermined position to the vessel takeout position, wherein a movement direction of the intermediate moving member and a movement direction of the vessel are the same when the vessel is taken in/out, wherein the transport mechanism includes:

a pair of first rails which slidably supports the housing and the intermediate moving member and extends in the movement direction of the intermediate moving member;

a pair of second rails which slidably supports the intermediate moving member and the vessel and extends in the movement direction of the vessel, the pair of second rails being provided on side surfaces of the intermediate moving member;

a belt which bridges across a pair of pulleys provided in the intermediate moving member to be looped thereover; and a moving pin which moves the vessel along with traveling of the belt, wherein the pair of pulleys are provided with vertical rotational shafts, the pair of first rails are provided on outer sides of the belt facing across the rotational shafts, and the pair of second rails provided on outer sides of the first rails facing across the first rails, wherein the first rails, the second rails, and the belt are placed side by side without overlapping with each other in a vertical direction, and wherein a distance from the predetermined position to the vessel takeout position is greater than a distance between a first pulley of the pair of pulleys and a second pulley of the pair of pulleys.

2. The automatic analysis apparatus according to claim 1, further comprising:

a damper which imparts viscous resistance depending on opening/closing operation speed over whole range of the opening/closing operation of the vessel or the intermediate moving member.

3. The automatic analysis apparatus according to claim 1, further comprising:

a motor provided in the intermediate moving member;

wherein the transport mechanism transports the vessel using the motor from the predetermined position to the vessel takeout position.

* * * * *